US010158488B2

(12) United States Patent
Bosworth et al.

(10) Patent No.: US 10,158,488 B2
(45) Date of Patent: *Dec. 18, 2018

(54) METHODS AND APPARATUS TO COLLECT DISTRIBUTED USER INFORMATION FOR MEDIA IMPRESSIONS AND SEARCH TERMS

(71) Applicant: The Nielsen Company (US), LLC, New York, NY (US)

(72) Inventors: Alan N. Bosworth, Odessa, FL (US); Madhusudhan Reddy Alla, Allen, TX (US); Steven J. Splaine, Tampa, FL (US); Brahmanand Reddy Shivampet, Oak Park, CA (US); Kevin K. Gaynor, Sunnyvale, CA (US)

(73) Assignee: THE NIELSEN COMPANY (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/984,096

(22) Filed: May 18, 2018

(65) Prior Publication Data
US 2018/0270062 A1  Sep. 20, 2018

Related U.S. Application Data

(63) Continuation of application No. 15/472,040, filed on Mar. 28, 2017, now Pat. No. 9,979,544, which is a
(Continued)

(51) Int. Cl.
*G06Q 50/00* (2012.01)
*G06Q 50/02* (2012.01)
(Continued)

(52) U.S. Cl.
CPC ............ *H04L 9/32* (2013.01); *G06F 21/6254* (2013.01); *G06Q 30/02* (2013.01);
(Continued)

(58) Field of Classification Search
CPC ............... G06Q 50/01; G06Q 10/1095; G06Q 30/0252; G06F 15/16
(Continued)

(56) References Cited

U.S. PATENT DOCUMENTS

| 2005/0262573 | A1* | 11/2005 | Bo ......................... G06F 21/10 726/27 |
| 2007/0300309 | A1* | 12/2007 | Naito ..................... G06F 21/10 726/27 |
| 2013/0326597 | A1* | 12/2013 | Matsushita ...... H04N 21/25875 726/5 |

FOREIGN PATENT DOCUMENTS

| CN | 102077182 | 5/2011 |
| CN | 103189856 | 7/2013 |

OTHER PUBLICATIONS

The State Intellectual Property Office of China, "First Notification of Office Action", issued in connection with Chinese Application No. 201480071626.X, dated Sep. 18, 2018, 13 pages.

* cited by examiner

*Primary Examiner* — Arvin Eskandarnia
(74) *Attorney, Agent, or Firm* — Hanley Flight & Zimmerman, LLC

(57) ABSTRACT

An example apparatus to collect distributed user information for media impressions and search terms includes means for collecting first and second identifiers based on use of an application that does not employ cookies, the first identifier identifying at least one of a device or a user of the device to a first database proprietor that stores first user information associated with the first identifier, and the second identifier identifying the at least one of the device or the user of the device to a second database proprietor that stores second user information associated with the second identifier, and means for sending identifiers to: send the first identifier to a
(Continued)

first server associated with the first database proprietor, send the second identifier to a second server associated with the second database proprietor, and send to a data collection server at least one of a media identifier indicative of media accessed via the application at the device or a search term used via the application at the device.

16 Claims, 19 Drawing Sheets

Related U.S. Application Data continuation of application No. 14/984,624, filed on Dec. 30, 2015, now Pat. No. 9,641,336, which is a continuation of application No. 14/261,085, filed on Apr. 24, 2014, now Pat. No. 9,237,138.

(60) Provisional application No. 61/922,584, filed on Dec. 31, 2013.

(51) Int. Cl.
*H04L 9/32* (2006.01)
*H04L 29/06* (2006.01)
*H04N 21/235* (2011.01)
*H04N 21/258* (2011.01)
*H04N 21/426* (2011.01)
*H04N 21/442* (2011.01)
*H04N 21/658* (2011.01)
*H04L 29/08* (2006.01)
*H04L 12/26* (2006.01)
*G06F 21/62* (2013.01)
*G06Q 30/02* (2012.01)
*H04W 12/06* (2009.01)

(52) U.S. Cl.
CPC ..... *G06Q 30/0201* (2013.01); *G06Q 30/0203* (2013.01); *G06Q 30/0251* (2013.01); *G06Q 50/01* (2013.01); *H04L 43/50* (2013.01); *H04L 63/062* (2013.01); *H04L 65/00* (2013.01); *H04L 67/22* (2013.01); *H04L 67/306* (2013.01); *H04N 21/2351* (2013.01); *H04N 21/25808* (2013.01); *H04N 21/25866* (2013.01); *H04N 21/42684* (2013.01); *H04N 21/44222* (2013.01); *H04N 21/6582* (2013.01); *H04W 12/06* (2013.01); *H04L 63/04* (2013.01)

(58) Field of Classification Search
USPC .......................................................... 709/201
See application file for complete search history.

METHODS AND APPARATUS TO COLLECT DISTRIBUTED USER INFORMATION FOR MEDIA IMPRESSIONS AND SEARCH TERMS

RELATED APPLICATION

This patent arises from a continuation of U.S. patent application Ser. No. 15/472,040, filed on Mar. 28, 2017, entitled "METHODS AND APPARATUS TO COLLECT DISTRIBUTED USER INFORMATION FOR MEDIA IMPRESSIONS AND SEARCH TERMS," which is a continuation of U.S. patent application Ser. No. 14/984,624, filed on Dec. 30, 2015, entitled "METHODS AND APPARATUS TO COLLECT DISTRIBUTED USER INFORMATION FOR MEDIA IMPRESSIONS AND SEARCH TERMS," now U.S. Pat. No. 9,641,336, which is a continuation of U.S. patent application Ser. No. 14/261,085, filed on Apr. 24, 2014, entitled "METHODS AND APPARATUS TO COLLECT DISTRIBUTED USER INFORMATION FOR MEDIA IMPRESSIONS AND SEARCH TERMS," now U.S. Pat. No. 9,237,138, and claims priority to U.S. Provisional Patent Application Ser. No. 61/922,584, filed Dec. 31, 2013, entitled "METHODS AND APPARATUS TO COLLECT DISTRIBUTED USER INFORMATION FOR MEDIA IMPRESSIONS AND SEARCH TERMS." The entireties of U.S. patent application Ser. No. 15/472,040, U.S. patent application Ser. No. 14/984,624, U.S. patent application Ser. No. 14/261,085 and U.S. Provisional Patent Application Ser. No. 61/922,584 are incorporated herein by reference in their entireties.

FIELD OF THE DISCLOSURE

The present disclosure relates generally to monitoring media and, more particularly, to methods and apparatus to collect distributed user information for media impressions and search terms.

BACKGROUND

Traditionally, audience measurement entities determine audience engagement levels for media programming based on registered panel members. That is, an audience measurement entity enrolls people who consent to being monitored into a panel. The audience measurement entity then monitors those panel members to determine media (e.g., television programs or radio programs, movies, DVDs, advertisements, etc.) exposed to those panel members. In this manner, the audience measurement entity can determine exposure measures for different media based on the collected media measurement data.

Techniques for monitoring user access to Internet resources such as web pages, advertisements and/or other media has evolved significantly over the years. Some known systems perform such monitoring primarily through server logs. In particular, entities serving media on the Internet can use known techniques to log the number of requests received for their media at their server.

DETAILED DESCRIPTION

Figure 1:
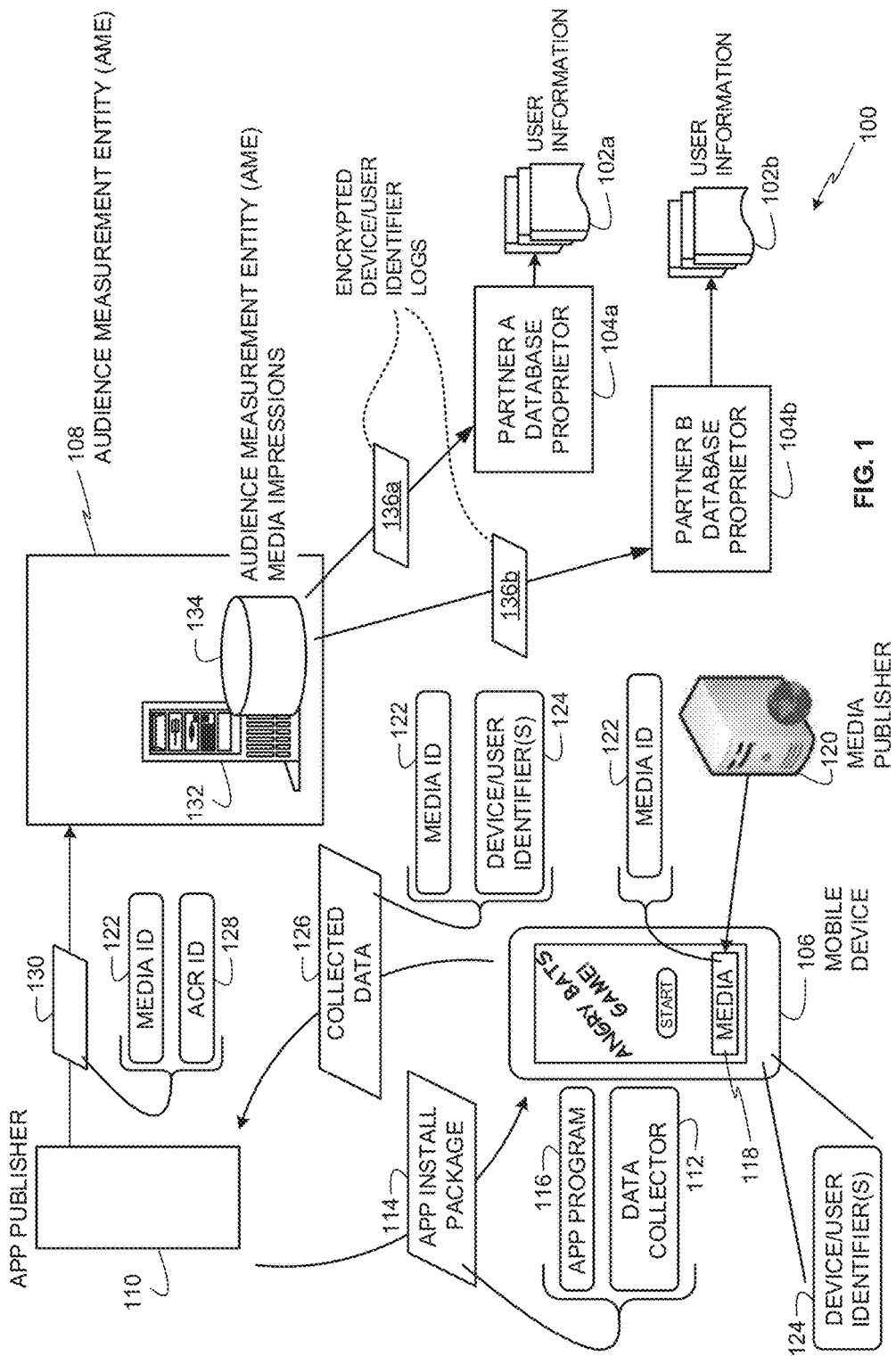
FIG. 1 depicts an example system to collect user information from distributed database proprietors for associating with impressions of media presented at mobile devices.

Techniques for monitoring user access to Internet resources such as web pages, advertisements and/or other media has evolved significantly over the years. At one point in the past, such monitoring was done primarily through server logs. In particular, entities serving media on the Internet would log the number of requests received for their media at their server. Basing Internet usage research on server logs is problematic for several reasons. For example, server logs can be tampered with either directly or via zombie programs which repeatedly request media from the server to increase the server log counts. Secondly, media is sometimes retrieved once, cached locally and then repeatedly viewed from the local cache without involving the server in the repeat viewings. Server logs cannot track these views of cached media. Thus, server logs are susceptible to both over-counting and under-counting errors.

The inventions disclosed in Blumenau, U.S. Pat. No. 6,108,637, fundamentally changed the way Internet monitoring is performed and overcame the limitations of the server side log monitoring techniques described above. For example, Blumenau disclosed a technique wherein Internet media to be tracked is tagged with beacon instructions. In particular, monitoring instructions are associated with the HTML of the media to be tracked. When a client requests the media, both the media and the beacon instructions are downloaded to the client. The beacon instructions are, thus, executed whenever the media is accessed, be it from a server or from a cache.

The beacon instructions cause monitoring data reflecting information about the access to the media to be sent from the client that downloaded the media to a monitoring entity. Typically, the monitoring entity is an audience measurement entity that did not provide the media to the client and who is a trusted third party for providing accurate usage statistics (e.g., The Nielsen Company, LLC). Advantageously, because the beaconing instructions are associated with the media and executed by the client browser whenever the media is accessed, the monitoring information is provided to the audience measurement company irrespective of whether the client is a panelist of the audience measurement company.

It is useful, however, to link demographics and/or other user information to the monitoring information. To address this issue, the audience measurement company establishes a panel of users who have agreed to provide their demographic information and to have their Internet browsing activities monitored. When an individual joins the panel, they provide detailed information concerning their identity and demographics (e.g., gender, race, income, home location, occupation, etc.) to the audience measurement company. The audience measurement entity sets a cookie on the panelist computer that enables the audience measurement entity to identify the panelist whenever the panelist accesses tagged media and, thus, sends monitoring information to the audience measurement entity.

Since most of the clients providing monitoring information from the tagged pages are not panelists and, thus, are unknown to the audience measurement entity, it is necessary to use statistical methods to impute demographic information based on the data collected for panelists to the larger population of users providing data for the tagged media. However, panel sizes of audience measurement entities remain small compared to the general population of users. Thus, a problem is presented as to how to increase panel sizes while ensuring the demographics data of the panel is accurate.

There are many database proprietors operating on the Internet. These database proprietors provide services to large numbers of subscribers. In exchange for the provision of the service, the subscribers register with the proprietor. As part of this registration, the subscribers provide detailed demographic information. Examples of such database proprietors include social network providers such as Facebook, Myspace, etc. These database proprietors set cookies on the computers of their subscribers to enable the database proprietor to recognize the user when they visit their website.

The protocols of the Internet make cookies inaccessible outside of the domain (e.g., Internet domain, domain name, etc.) on which they were set. Thus, a cookie set in the amazon.com domain is accessible to servers in the amazon.com domain, but not to servers outside that domain. Therefore, although an audience measurement entity might find it advantageous to access the cookies set by the database proprietors, they are unable to do so. In addition, apps that run on mobile device platforms and/or other platforms do not use cookies in the same way as web browsers. Although apps do present media that is worthy of impression tracking, prior techniques that use cookie-based approaches for tracking such media impressions are unusable in the app environment context. Apps are being used on increasing numbers of platforms, including smart televisions, video game consoles, digital media players, automobile infotainment systems, and/or other types of devices. Even more "traditional" desktop computers and/or notebooks running "desktop" operating systems have included app functions similar to those used on mobile devices. As used herein, the term "media device" refers to any type of computing device that is able to execute an app. Media devices include, but are not limited to, mobile devices, smart televisions, video game consoles, digital media players, automobile infotainment systems, and desktop and notebook computers. Further, while examples disclosed herein describe mobile devices, the examples are applicable to and/or may be modified for any other types of media devices. As used herein, apps are defined to be software applications that are selectable by the user to accomplish associated tasks. Apps may have dependencies, such as dependencies on other apps and/or on services provided by the operating system. In some cases, apps may be specifically designed for mobile devices and/or other non-traditional computing platforms (e.g., computing platforms besides desktop and/or laptop computers). As used herein, cookieless apps are defined to be apps that do not employ cookies.

In view of the foregoing, an audience measurement company would like to leverage the existing databases of database proprietors to collect more extensive Internet usage and demographic data and/or user data for associating with media impressions tracked on devices that execute apps that do not employ cookies which are more commonly used in web browsers. However, the audience measurement entity is faced with several problems in accomplishing this end. For example, a problem is presented as to how to access the data of the database proprietors without compromising the privacy of the subscribers, the panelists, or the proprietors of the tracked media. Another problem is how to access this data given the technical restrictions imposed by app software platforms of mobile devices that do not employ cookies.

Example methods, apparatus and/or articles of manufacture disclosed herein enable tracking media impressions for media presented by mobile device apps that execute on mobile devices, without needing to rely on cookies to track such media impressions. In this manner, an audience measurement entity (AME) can track media impressions on mobile devices on which apps that do not employ cookies have higher usage rates than web browsers that do employ cookies. Examples disclosed herein also protect privacies of users by encrypting identification information in such a way that personally-identifying information is not revealed to the AME. Examples disclosed herein accomplish this by using an application campaign rating (ACR) identifier (ID) that includes one or more encrypted device and/or user identifier(s) (i.e., device/user identifier(s)) retrieved from a mobile device. The one or more encrypted device/user identifier(s) can then be used to retrieve user information for a user of the mobile device by sending the one or more encrypted device/user identifier(s) to one or more corresponding database proprietors that store user information for its registered users. In the illustrated examples, to protect users' privacies, the AME does not have keys to decrypt the encrypted device/user identifiers, and each database proprietor has only its respective key(s) useable to decrypt only device/user identifier(s) pertaining to its services (e.g., wireless carrier services, social networking services, email services, mobile phone ecosystem app or media services, etc.). In this manner, personally-identifying information for particular services will not be revealed to the AME or to just any database proprietor, but only to the database proprietor that provides the particular service.

In some examples in which the privacy regulations or practices of a jurisdiction do not require that some or all device identifiers or user identifiers be encrypted and decrypted, examples disclosed herein do not encrypt the device/user identifiers prior to sending them to the different database proprietors. In some such examples, a level of user privacy protection is achieved by sending selected user/device identifiers only to database proprietors associated with the selected user/device identifiers. For example, a third party identifier may be sent only to the third party associated with that identifier, or to a party associated with the third party and, for example, serving as a database proprietor.

In examples disclosed herein, when an audience measurement entity receives an ACR ID including one or more encrypted device/user identifier(s), the audience measurement entity can request user information from one or more partnered database proprietors for the encrypted device/user identifier(s). In this manner, the partnered database proprietor(s) can provide user information to the audience measurement entity for the encrypted device/user identifier(s), and associate the user information with one or more media ID's of media presented by app(s) on one or more mobile device(s). Because the identification of users or client mobile devices is done with reference to enormous databases of users far beyond the quantity of persons present in a conventional audience measurement panel, the data developed from this process is extremely accurate, reliable and detailed. In some examples, by agreeing to participate in concerted audience measurement efforts, the partnered database proprietors are provided with audience user information and exposure information collected by other partnered database proprietors. In this manner, partnered database proprietors can supplement their own audience exposure metrics with information provided by other partnered database proprietors.

Example methods, apparatus, and articles of manufacture disclosed herein can be used to determine media impressions, advertisement impressions, media exposure, and/or advertisement exposure using user information, which is distributed across different databases (e.g., different website owners, service providers, etc.) on the Internet. Not only do example methods, apparatus, and articles of manufacture disclosed herein enable more accurate correlation of Internet media exposure to user information, but they also effectively extend panel sizes and compositions beyond persons participating in the panel of an audience measurement entity and/or a ratings entity to persons registered in other Internet databases such as the databases of wireless service carriers, mobile software/service providers, social medium sites (e.g., Facebook, Twitter, Google, etc.), and/or any other Internet sites such as Yahoo!, MSN, Apple iTunes, Experian, etc. This extension effectively leverages the media impression tracking capabilities of the audience measurement entity and the use of databases of non-AME entities such as social media and other websites to create an enormous, demographically accurate panel that results in accurate, reliable measurements of exposures to Internet media such as advertising and/or programming.

Traditionally, audience measurement entities (also referred to herein as "ratings entities") determine demographic reach for advertising and media programming based on registered panel members. That is, an audience measurement entity enrolls people that consent to being monitored into a panel. During enrollment, the audience measurement entity receives demographic information from the enrolling people so that subsequent correlations may be made between advertisement/media exposure to those panelists and different demographic markets. Unlike traditional techniques in which audience measurement entities rely solely on their own panel member data to collect demographics-based audience measurement, example methods, apparatus, and/or articles of manufacture disclosed herein enable an audience measurement entity to share demographic information with other entities that operate based on user registration models. As used herein, a user registration model is a model in which users subscribe to services of those entities by creating an account and providing demographic-related information about themselves. Sharing of demographic information associated with registered users of database proprietors enables an audience measurement entity to extend or supplement their panel data with substantially reliable demographics information from external sources (e.g., database proprietors), thus extending the coverage, accuracy, and/or completeness of their demographics-based audience measurements. Such access also enables the audience measurement entity to monitor persons who would not otherwise have joined an audience measurement panel. Any entity having a database identifying demographics of a set of individuals may cooperate with the audience measurement entity. Such entities may be referred to as "database proprietors" and include entities such as wireless service carriers, mobile software/service providers, social medium sites (e.g., Facebook, Twitter, Google, etc.), and/or any other Internet sites such as Yahoo!, MSN, Apple iTunes, Experian, etc.

Example methods, apparatus, and/or articles of manufacture disclosed herein may be implemented by an audience measurement entity (e.g., any entity interested in measuring or tracking audience exposures to advertisements, media, and/or any other media) in cooperation with any number of database proprietors such as online web services providers to develop online media exposure metrics. Such database proprietors/online web services providers may be wireless service carriers, mobile software/service providers, social network sites (e.g., Facebook, Twitter, MySpace, etc.), multi-service sites (e.g., Yahoo!, Google, Experian, etc.), online retailer sites (e.g., Amazon.com, Buy.com, etc.), and/or any other web service(s) site that maintains user registration records.

In some examples, to increase the likelihood that measured viewership is accurately attributed to the correct demographics, example methods, apparatus, and/or articles of manufacture disclosed herein use user information located in the audience measurement entity's records as well as user information located at one or more database proprietors (e.g., web service providers) that maintain records or profiles of users having accounts therewith. In this manner, example methods, apparatus, and/or articles of manufacture disclosed herein may be used to supplement user information maintained by a ratings entity (e.g., an audience measurement company such as The Nielsen Company of Schaumburg, Ill., United States of America, that collects media exposure measurements, demographics, and/or other user information) with user information from one or more different database proprietors (e.g., web service providers).

The use of demographic information from disparate data sources (e.g., high-quality demographic information from the panels of an audience measurement company and/or registered user data of web service providers) results in improved reporting effectiveness of metrics for both online and offline advertising campaigns. Example techniques disclosed herein use online registration data to identify demographics of users, and/or other user information, and use server impression counts, and/or other techniques to track quantities of impressions attributable to those users. Online web service providers such as wireless service carriers, mobile software/service providers, social network sites (e.g., Facebook, Twitter, MySpace, etc.), multi-service sites (e.g., Yahoo!, Google, Experian, etc.), online retailer sites (e.g., Amazon.com, Buy.com, etc.), etc. (collectively and individually referred to herein as online database proprietors) maintain detailed demographic information (e.g., age, gender, geographic location, race, income level, education level, religion, etc.) collected via user registration processes. An impression corresponds to a home or individual having been exposed to the corresponding media and/or advertisement. Thus, an impression represents a home or an individual having been exposed to an advertisement or media or group of advertisements or media. In Internet advertising, a quantity of impressions or impression count is the total number of times an advertisement or advertisement campaign has been accessed by a web population (e.g., including number of times accessed as decreased by, for example, pop-up blockers and/or increased by, for example, retrieval from local cache memory).

FIG. 1 depicts an example system 100 to collect user information (e.g., user information 102a and 102b) from distributed database proprietors 104a and 104b for associating with impressions of media presented at a mobile device 106. In the illustrated examples, user information or user data includes one or more of demographic data, purchase data, and/or other data indicative of user activities, behaviors, and/or preferences related to information accessed via the Internet, purchases, media accessed on electronic devices, physical locations (e.g., retail or commercial establishments, restaurants, venues, etc.) visited by users, etc. Examples disclosed herein are described in connection with a mobile device, which may be a mobile phone, a mobile communication device, a tablet, a gaming device, a portable media presentation device, etc. However, examples disclosed herein may be implemented in connection with non-mobile devices such as internet appliances, smart televisions, internet terminals, computers, or any other device capable of presenting media received via network communications.

In the illustrated example of FIG. 1, to track media impressions on the mobile device 106, an audience measurement entity (AME) 108 partners with or cooperates with an app publisher 110 to download and install a data collector 112 on the mobile device 106. The app publisher 110 of the illustrated example may be a software app developer that develops and distributes apps to mobile devices and/or a distributor that receives apps from software app developers and distributes the apps to mobile devices. In the illustrated example, to download and install the data collector 112 on the mobile device 106, the app publisher 110 downloads an app install package 114 to the mobile device 106 when the mobile device 106 requests a purchased or free app program 116. The app publisher 110 locates the requested app program 116 and the data collector 112 in the app install package 114, and then it sends the app install package 114 to the mobile device 106 for installing the app program 116 and the data collector 112. In some examples, the app publisher 110 may first obtain the consent of a user of the mobile device 106 to participate in a media tracking program before sending the data collector 112 for installation on the mobile device 106.

In the illustrated example, the app program 116 is a game entitled "Angry Bats" that presents media 118 received from a media publisher 120. The media 118 may be an advertisement, video, audio, text, a graphic, a web page, news, educational media, entertainment media, or any other type of media. In the illustrated example, a media ID 122 is provided in the media 118 to enable identifying the media 118 so that the AME 108 can credit the media 118 with media impressions when the media 118 is presented on the mobile device 106 or any other device that is monitored by the AME 108.

In the illustrated example, the AME 108 provides the data collector 112 to the app publisher 110 for packaging with the app program 116 in the app install package 114. In some examples, the app publisher 110 provides the data collector 112 as a program separate from the app program 116. In other examples, the app publisher 110 compiles or otherwise includes the data collector 112 in the app program 116 rather than installing the data collector 112 as a program separate from the app program 116. The data collector 112 of the illustrated example includes instructions (e.g., Java, java script, or any other computer language or script) that, when executed by the mobile device 106, cause the mobile device 106 to collect the media ID 122 of the media 118 presented by the app program 116 and/or the mobile device 106, and to collect one or more device/user identifier(s) 124 stored in the mobile device 106. The device/user identifier(s) 124 of the illustrated example include identifiers that can be used by corresponding ones of the partner database proprietors 104a-b to identify the user or users of the mobile device 106, and to locate user information 102*a-b* corresponding to the user(s). For example, the device/user identifier(s) 124 may include hardware identifiers (e.g., an international mobile equipment identity (IMEI), a mobile equipment identifier (MEID), a media access control (MAC) address, etc.), an app store identifier (e.g., a Google Android ID, an Apple ID, an Amazon ID, etc.), an open source unique device identifier (OpenUDID), an open device identification number (ODIN), a login identifier (e.g., a username), an email address, user agent data (e.g., application type, operating system, software vendor, software revision, etc.), third-party service identifiers (e.g., advertising service identifiers, device usage analytics service identifiers, demographics collection service identifiers), etc. In some examples, fewer or more device/user identifier(s) 124 may be used. In addition, although only two partner database proprietors 104*a-b* are shown in FIG. 1, the AME 108 may partner with any number of partner database proprietors to collect distributed user information (e.g., the user information 102*a-b*).

In some examples, the types of device/user identifiers 124 are different from device to device depending on the type of device, the manufacturer of the device, the software installed on the device, etc. For example, a mobile device having cellular 2G, 3G, and/or 4G capabilities will have an assigned IMEI number. However, a mobile device capable of Wi-Fi, but not having cellular communication capabilities, will not have an IMEI number. As such, one or more other parameter(s) of the Wi-Fi mobile device may be used as the device/user identifiers 124. Such other parameters may include, for example, a MAC address, a login ID, or any other identifier or information available to the Wi-Fi capable device and that is not specific to cellular communications.

By being able to select or access multiple different types of device/user identifiers 124, the AME 108 increases the opportunities for collecting corresponding user information. For example, the AME 108 is not tied to requesting user information from a single source (e.g., only one of the partner database proprietors 104*a-b*). Instead, the AME 108 can leverage relationships with multiple partner database proprietors (e.g., the partner database proprietors 104*a-b*). If one or some partner database proprietors are unable or become unwilling to share user data, the AME 108 can request the user data from one or more other partner database proprietor(s).

In some examples, the mobile device 106 may not allow access to identification information stored in the mobile device 106. For such instances, the disclosed examples enable the AME 108 to store an AME-provided identifier (e.g., an identifier managed and tracked by the AME 108) in the mobile device 106 to track media impressions on the mobile device 106. For example, the AME 108 may provide instructions in the data collector 112 to set an AME-provided identifier in memory space accessible by and/or allocated to the app program 116, and the data collector 112 uses the identifier as a device/user identifier 124. In such examples, the AME-provided identifier set by the data collector 112 persists in the memory space even when the app program 116 and the data collector 112 are not running. In this manner, the same AME-provided identifier can remain associated with the mobile device 106 for extended durations. In some examples in which the data collector 112 sets an identifier in the mobile device 106, the AME 108 may recruit a user of the mobile device 106 as a panelist, and may store user information collected from the user during a panelist registration process and/or collected by monitoring user activities/behavior via the mobile device 106 and/or any other device used by the user and monitored by the AME 108. In this manner, the AME 108 can associate user information of the user (from panelist data stored by the AME 108) with media impressions attributed to the user on the mobile device 106.

In the illustrated example, the data collector 112 sends the media ID 122 and the one or more device/user identifier(s) 124 as collected data 126 to the app publisher 110. Alternatively, the data collector 112 may be configured to send the collected data 126 to another collection entity (other than the app publisher 110) that has been contracted by the AME 108 or is partnered with the AME 108 to collect media ID's (e.g., the media ID 122) and device/user identifiers (e.g., the device/user identifier(s) 124) from mobile devices (e.g., the mobile device 106). In the illustrated example, the app publisher 110 (or a collection entity) generates an ACR ID 128 that includes the device/user identifier(s) 124, and the app publisher (or a collection entity) sends the media ID 122 and the ACR ID 128 as impression data 130 to a server 132 at the AME 108. The impression data 130 of the illustrated example may include one media ID 122 and one ACR ID 128 to report a single impression of the media 118, or it may include numerous media ID's and ACR ID's based on numerous instances of collected data (e.g., the collected data 126) received from the mobile device 106 and/or other mobile devices to report multiple impressions of media. In the illustrated example, the server 132 of the illustrated example stores the impression data 130 in an AME media impressions store 134 (e.g., a database or other data structure). Subsequently, the AME 108 sends the device/user identifier(s) 124 from the ACR ID 128 to corresponding partner database proprietors (e.g., the partner database proprietors 104*a-b*) to receive user information (e.g., the user information 102*a-b*) corresponding to the device/user identifier(s) 124 from the partner database proprietors so that the AME 108 can associate the user information with corresponding media impressions of media (e.g., the media 118) presented at mobile devices (e.g., the mobile device 106).

Although the above description describes the app publisher 110 (or other collection entity) as generating the ACR ID 128, in other examples, the data collector 112 at the mobile device 106 generates the ACR ID 128 that includes the device/user identifier(s) 124. In such examples, the data collector 112 sends the ACR ID 128 to the app publisher 110 (or other collection entity) in the collected data 126.

In the illustrated example, to protect the privacy of the user of the mobile device 106, the device/user identifier(s) 124 is/are encrypted before sending it/them to the AME 108 in the ACR ID 128. In the illustrated examples, the encryption process is performed so that neither the app publisher (110) (or other collection entity) nor the AME 108, or any other intermediate entity, can access the device/user identifier(s) 124 before they are sent to corresponding partner database proprietors (e.g., the partner database proprietors 104*a-b*). To encrypt the device/user identifier(s) 124, each partner database proprietor (e.g., the partner database proprietors 104*a-b*) for which identification information can be retrieved from the mobile device 106 is provided with one or more encryption keys specific to that partner database proprietor. In this manner, each partner database proprietor has a different set of keys so that each partner database proprietor can only recover one or more of the device/user identifier(s) 124 that pertain(s) to it. For example, a wireless service carrier can only retrieve an IMEI or MEID number, a social network site can only retrieve a login username corresponding to its social network services, etc. Copies of the one or more encryption keys can be provided to the app publisher 110 in an encryption algorithm (e.g., an SSH-1 encryption algorithm). In the illustrated example, the AME 108 provides the encryption algorithm and the encryption keys to the app publisher 110 as an encryption software package or bundle (e.g., an encryptor 202 of FIG. 2) from which the app publisher 110 cannot recover or extract the encryption keys. In this manner, the app publisher 110 is not able to access the device/user identifier(s) 124. In other examples, the app publisher 110 is able to access the device/user identifier(s) 124 if authorized by a user of the mobile device 106 (e.g., during installation of the app program 116). In such examples, the app publisher 110 may still encrypt the device/user identifier(s) 124 before sending them to the AME 108.

In the illustrated examples, the encryption algorithm is also provided with partner database proprietor identifiers along with corresponding ones of the encryption keys for each of the partner database proprietors (e.g., the partner database proprietors 104*a-b*). When encrypting the device/user identifier(s) 124, the encryption algorithm can append, prepend, concatenate, or otherwise associate corresponding partner database proprietor identifiers to or with the encrypted device/user identifier(s) (e.g., encrypted device/user identifier(s) 208*a-b* of FIG. 2) so that the AME 108 can access the partner database proprietor identifiers, without decrypting the encrypted device/user identifier(s), to identify which of the encrypted device/user identifier(s) corresponds to which partner database proprietor. In this manner, the AME 108 can deliver the encrypted device/user identifier(s) to corresponding partner database proprietor(s) even though it cannot decrypt the device/user identifier(s) 124.

In some examples, the app publisher 110 can run the encryption software at one of its servers or computers that receives the collected data 126 from the mobile device 106. In such examples, the media ID 122 and the device/user identifier(s) 124 are sent by the mobile device 106 as the collected data 126 via a secure connection between the encryption software running at the app publisher 110 and the mobile device 106. In this manner, the device/user identifier(s) 124 is/are not intercepted by the app publisher 110 before they are encrypted using the encryption keys corresponding to the different database proprietors.

In other examples, the encryption software to encrypt the device/user identifier(s) 124 is provided in the data collector 112 so that the data collector 112 can encrypt the device/user identifier(s) 124 at the mobile device 106 before sending encrypted device/user identifier(s) to the app publisher 110 (or other collection entity). In some examples in which the data collector 112 encrypts the device/user identifier(s) 124, the data collector 112 also encodes the encrypted device/user identifier(s) into an ACR ID (e.g., the ACR ID 128). In such examples, the data collector 112 sends the ACR ID 128 and the media ID 122 to the app publisher 110 (or other collection entity) in the collected data 126.

After the AME 108 receives the ACR ID 128 including the device/user identifier(s) 124 in encrypted format, the AME 108 sends encrypted device/user identifier logs 136*a-b* to corresponding partner database proprietors (e.g., the partner database proprietors 104*a-b*). In the illustrated example, each of the encrypted device/user identifier logs 136*a-b* may include a single encrypted device/user identifier, or it may include numerous aggregate encrypted device/user identifiers received over time from one or more mobile devices. After receiving the encrypted device/user identifier logs 136*a-b*, each of the partner database proprietors 104*a-b* decrypts its respective encrypted device/user identifiers using its copy(ies) of the encryption key(s). The partner database proprietors 104*a-b* then look up their users corresponding to the decrypted device/user identifiers, and collect corresponding user information 102*a-b* for those users for sending to the AME 108. For example, if the partner database proprietor 104*a* is a wireless service provider, the encrypted device/user identifier log 136*a* includes IMEI numbers, and the wireless service provider accesses its subscriber records to find users having IMEI numbers matching the IMEI numbers received in the encrypted device/user identifier log 136*a*. When the users are identified, the wireless service provider copies the users' user information to the user information 102*a* for delivery to the AME 108.

Figure 9:
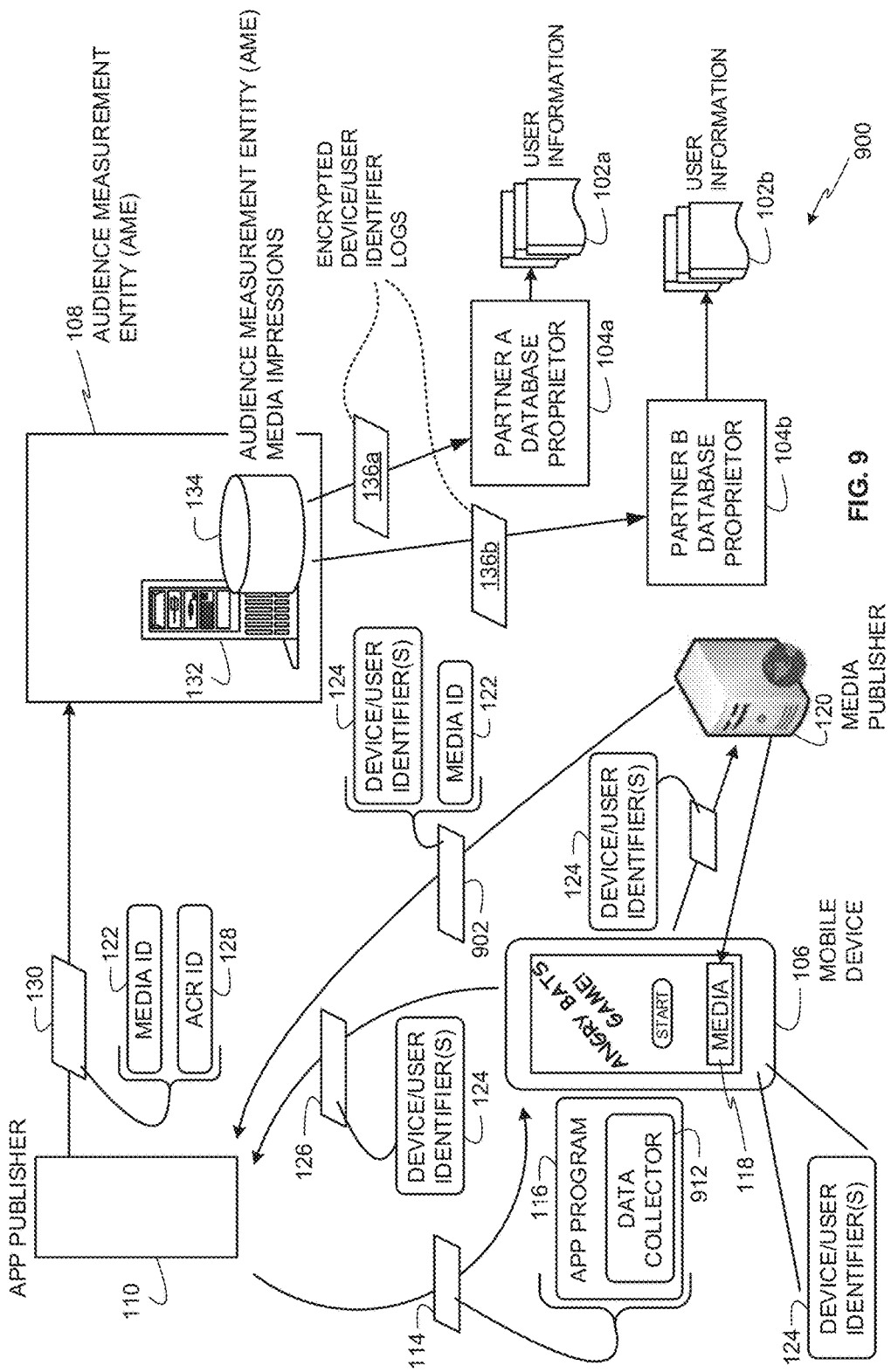
FIG. 9 depicts another example system to collect user information from distributed database proprietors for associating with impressions of media presented at mobile devices.

FIG. 9 depicts another example system 900 to collect user information (e.g., the user information 102*a* and 102*b*) from distributed database proprietors 104*a* and 104*b* for associating with impressions of media presented at the mobile device 106. In the illustrated example of FIG. 9, like reference numbers are used to refer to the same or similar components as described above in connection with FIG. 1. In the illustrated example of FIG. 9, a data collector 912 is shown as being located in the app program 116. For example, the data collector 912 may include instructions coded in the app program 116 to collect data in the mobile device 106. Alternatively, the data collector 912 may be a separate program downloaded separate from the app program 116 as part of the app install package 114 from the app publisher 110.

In the illustrated example of FIG. 9, the data collector 912 is configured to collect the device/user identifier(s) 124 from the mobile device 106. The example data collector 912 sends the device/user identifier(s) 124 to the app publisher 110 in the collected data 126, and it also sends the device/user identifier(s) 124 to the media publisher 120. The data collector 912 of the illustrated example does not collect the media ID 122 from the media 118 at the mobile device 106 as the data collector 112 does in the example system 100 of FIG. 1. Instead, the media publisher 120 that publishes the media 118 to the mobile device 106 retrieves the media ID 122 from the media 118 that it publishes. The media publisher 120 then associates the media ID 122 to the device/user identifier(s) 124 of the mobile device 106, and sends collected data 902 to the app publisher 110 that includes the media ID 122 and the associated device/user identifier(s) 124 of the mobile device 106. For example, when the media publisher 120 sends the media 118 to the mobile device 106, it does so by identifying the mobile device 106 as a destination device for the media 118 using one or more of the device/user identifier(s) 124. In this manner, the media publisher 120 can associate the media ID 122 of the media 118 with the device/user identifier(s) 124 of the mobile device 106 indicating that the media 118 was sent to the particular mobile device 106 for presentation (e.g., to generate an impression of the media 118).

In the illustrated example, the app publisher 110 matches the device/user identifier(s) 124 from the collected data 902 to the device/user identifier(s) 124 from the collected data 126 to determine that the media ID 122 corresponds to media (e.g., the media 118) presented on the mobile device 106 associated with the device/user identifier(s) 124. The app publisher 110 of the illustrated example also generates an ACR ID 128 based on the device/user identifier(s) 124 as disclosed herein. The app publisher 110 then sends the impression data 130, including the media ID 122 and the associated ACR ID 128, to the AME 108. The AME 108 can then send the encrypted device/user identifier logs 136*a-b* to the partner database proprietors 104*a*-*b* to request the user information 102*a*-*b* as described above in connection with FIG. 1.

Figure 10:
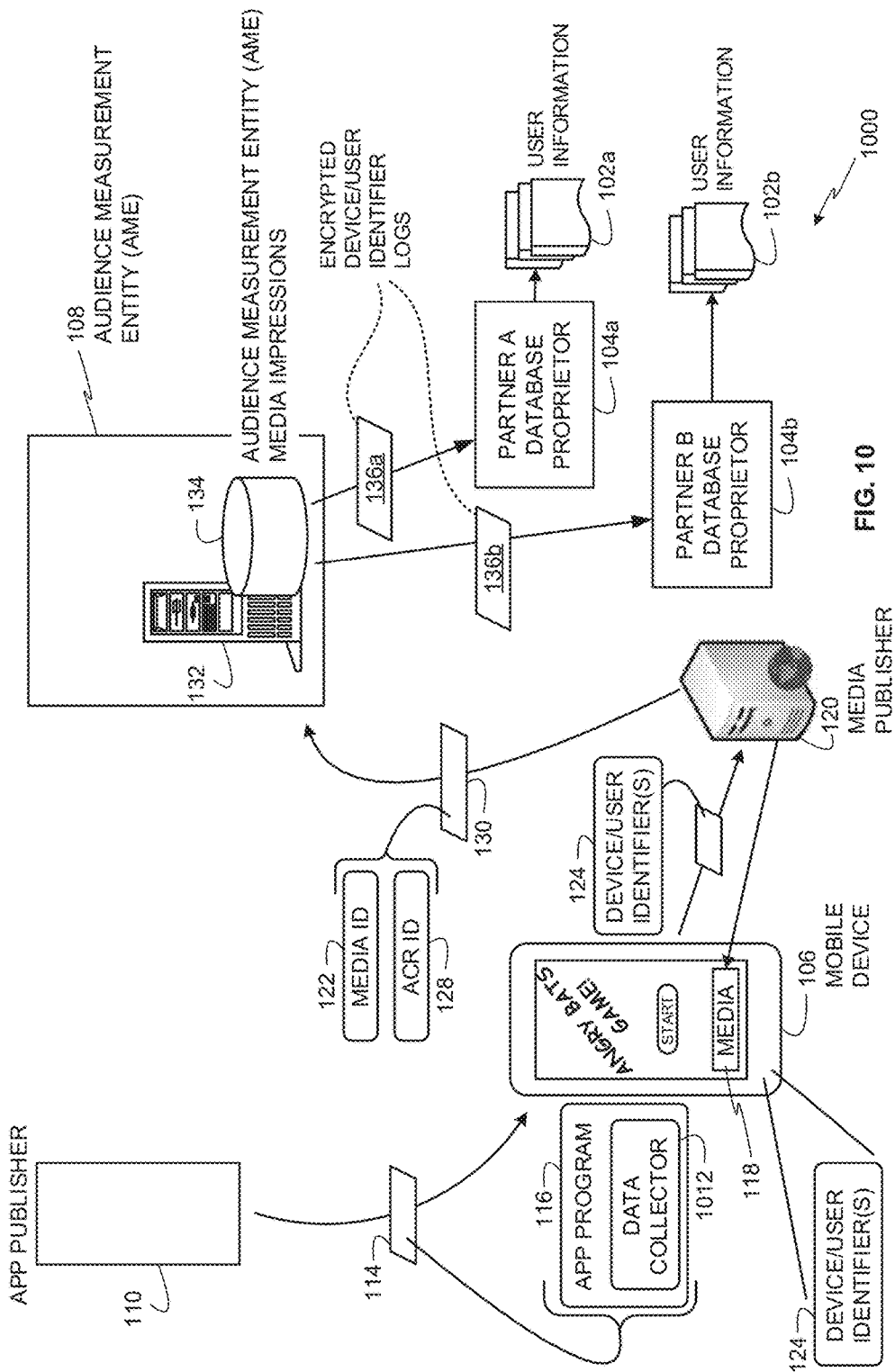
FIG. 10 depicts yet another example system to collect user information from distributed database proprietors for associating with impressions of media presented at mobile devices.

FIG. 10 depicts yet another example system 1000 to collect user information (e.g., the user information 102*a* and 102*b*) from distributed database proprietors 104*a* and 104*b* for associating with impressions of media presented at the mobile device 106. In the illustrated example of FIG. 10, like reference numbers are used to refer to the same or similar components as described above in connection with FIG. 1. In the illustrated example of FIG. 10, a data collector 1012 is shown as being located in the app program 116. For example, the data collector 1012 may include instructions coded in the app program 116 to collect data in the mobile device 106. Alternatively, the data collector 1012 may be a separate program downloaded separate from the app program 116 as part of the app install package 114 from the app publisher 110.

In the illustrated example of FIG. 10, the data collector 1012 is configured to collect the device/user identifier(s) 124 from the mobile device 106. The example data collector 1012 sends the device/user identifier(s) 124 to the media publisher 120. The data collector 1012 of the illustrated example does not collect the media ID 122 from the media 118 at the mobile device 106 as the data collector 112 does in the example system 100 of FIG. 1. Instead, the media publisher 120 that publishes the media 118 to the mobile device 106 retrieves the media ID 122 from the media 118 that it publishes. The media publisher 120 then associates the media ID 122 to the device/user identifier(s) 124 of the mobile device 106, and generates the ACR ID 128 based on the device/user identifier(s) 124 as disclosed herein. The media publisher 120 then sends the media impression data 130, including the media ID 122 and the ACR ID 128, to the AME 108. For example, when the media publisher 120 sends the media 118 to the mobile device 106, it does so by identifying the mobile device 106 as a destination device for the media 118 using one or more of the device/user identifier(s) 124. In this manner, the media publisher 120 can associate the media ID 122 of the media 118 with the device/user identifier(s) 124 and the ACR ID 128 of the mobile device 106 indicating that the media 118 was sent to the particular mobile device 106 for presentation (e.g., to generate an impression of the media 118). In the illustrated example, after the AME 108 receives the impression data 130 from the media publisher 120, the AME 108 can then send the encrypted device/user identifier logs 136*a*-*b* to the partner database proprietors 104*a*-*b* to request the user information 102*a*-*b* as described above in connection with FIG. 1.

Although the media publisher 120 is shown separate from the app publisher 110 in FIGS. 1, 9, and 10, the app publisher 110 may implement at least some of the operations of the media publisher 120 to send the media 118 to the mobile device 106 for presentation. For example, advertisement, media, or other media providers may send media (e.g., the media 118) to the app publisher 110 for publishing to the mobile device 106 via, for example, the app program 116 when it is executing on the mobile device 106. In such examples, the app publisher 110 implements the operations described above as being performed by the media publisher 120.

In some examples, the media publisher 120 operates as a third-party media publisher relative to other traditional media publishers. In such examples, the media publisher 120 receives media from media providers and/or other traditional media publishers for publishing to electronic devices (e.g., the mobile device 106) while tracking media impressions of the published media (e.g., the media 118) and/or identities of devices to which media is published. That is, in addition to performing traditional media publisher services of publishing media to electronic devices, the media publisher 120 of the illustrated example additionally collects media impression tracking information as discussed above in connection with FIGS. 9 and 10. Thus, in some examples, the media publisher 120 is a third party that is contracted by traditional media publishers to provide media impression tracking capabilities for collecting media impressions and user information (e.g., the user information 102*a*-*b*) as disclosed herein.

In addition to associating user information (e.g., the user information 102*a*-*b*) with media IDs (e.g., the media ID 122) of published media, examples disclosed herein may additionally or alternatively be used to associate user information with other types of information collected from mobile devices representative of user interests and/or user behaviors. For example, techniques disclosed herein may also be used to monitor search terms provided by users at mobile devices, and associating those search terms with user information of users that provide the search terms. Example search terms may be provided via apps downloaded and installed on mobile devices, for searching information on the Internet and/or products at stores, websites, etc. For example, a search term may cause a search to be performed for information on the Internet, a search to be performed for a product, a search of a website to be performed, or a search for a website to be performed. Example systems that may be used to monitor search terms are described below in connection with FIGS. 12-14. In the illustrated examples of FIGS. 12-14, like reference numbers are used to refer to the same or similar components as described above in connection with FIG. 1.

Figure 12:
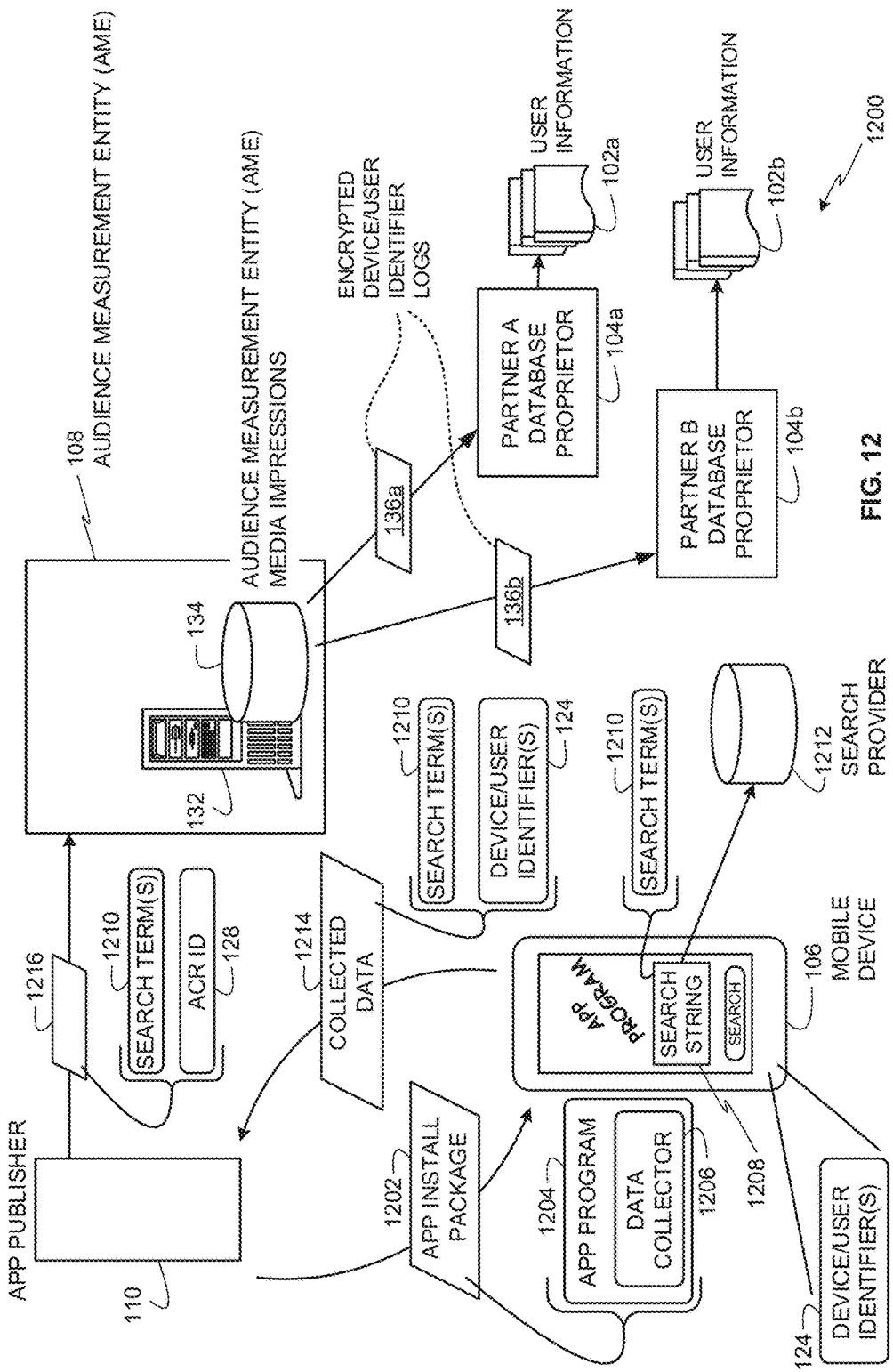
FIG. 12 is an example system to collect user information from distributed database proprietors for associating with search terms provided by users at mobile devices.

FIG. 12 is an example system 1200 to collect user information (e.g., the user information 102*a* and 102*b*) from distributed database proprietors 104*a*-*b* for associating with search terms (e.g., search terms 1210) provided by users at mobile devices (e.g., the mobile device 106). In the illustrated example of FIG. 12, a data collector 1206 is shown as being located in an app program 1204 downloaded to the mobile device 106 in an app install package 1202 from the app publisher 110. For example, the data collector 1206 may include instructions coded in the app program 1204 to collect data in the mobile device 106. Alternatively, the data collector 1206 may be a separate program downloaded separate from the app program 1204 as part of the app install package 1202 from the app publisher 110.

In the illustrated example of FIG. 12, the app program 1204 provides search functionality so that users may search, for example, information on the Internet, products, services, etc. For example, when executing on the mobile device 106, the app program 1204 provides a search field 1208 for entering a search string including one or more search term(s) 1210. To provide the search functionality, the app program 1204 of the illustrated example sends the search term(s) 1210 to a search service provider 1212. In this manner, the search service provider 1212 can perform the requested search, and return search results to the app program 1204 at the mobile device 106. In the illustrated example, the search service provider 1212 may be an Internet search engine (e.g., Google, Yahoo!, Bing, etc.), an Internet portal website, a retailer, etc.

When a user provides the search term(s) 1210 in the search field 1208, the data collector 1206 sends the search term(s) 1210, and the device/user identifier(s) 124 to the app publisher 110 as collected data 1214. The app publisher 110 can then generate the ACR ID 128 based on the device/user identifier(s) 124 using example techniques disclosed herein, and send the search term(s) 1210 and the ACR ID 128 to the AME 108 as user-interest data 1216. In other examples, the data collector 1206 may be configured to send the search term(s) 1210 and the ACR ID 128 (or the device/user identifier(s) 124) as the user-interest data 1216 directly to the AME 108. The AME 108 can then send the encrypted device/user identifier logs 136a-b to the partner database proprietors 104a-b to request the user information 102a-b as described above in connection with FIG. 1.

Figure 13:
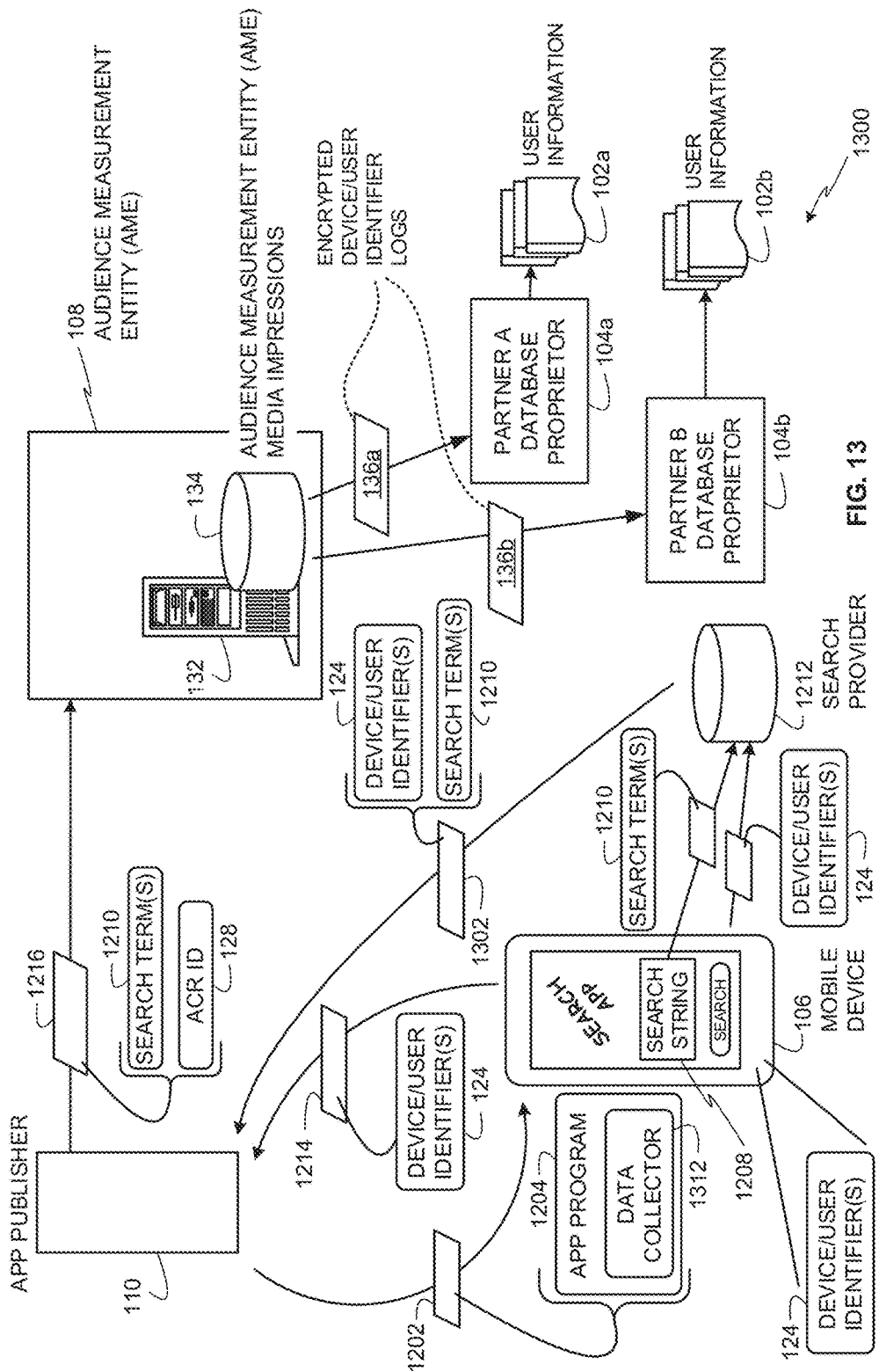
FIG. 13 depicts another example system to collect user information from distributed database proprietors for associating with search terms provided by users at mobile devices.

FIG. 13 depicts another example system 1300 to collect user information (e.g., the user information 102a and 102b) from distributed database proprietors 104a-b for associating with search terms (e.g., the search term(s) 1210) provided by users at mobile devices. In the illustrated example of FIG. 13, a data collector 1312 is shown as being located in the app program 1204. For example, the data collector 1312 may include instructions coded in the app program 1204 to collect data in the mobile device 106. Alternatively, the data collector 1312 may be a separate program downloaded separate from the app program 1204 as part of the app install package 1202 from the app publisher 110.

In the illustrated example of FIG. 9, the data collector 1312 is configured to collect the device/user identifier(s) 124 from the mobile device 106. The example data collector 1312 sends the device/user identifier(s) 124 to the app publisher 110 in the collected data 1214, and it also sends the device/user identifier(s) 124 to the search provider 1212. The data collector 1312 of the illustrated example does not collect the search terms 1210 from the search field 1208 at the mobile device 106 as the data collector 1206 does in the example system 1200 of FIG. 12. Instead, the search provider 1212 collects the search term(s) 1210 when received from the app program 1204. The search provider 1212 then associates the search term(s) 1210 with the device/user identifier(s) 124 of the mobile device 106, and sends collected data 1302 to the app publisher 110 that includes the search term(s) 1210 and the associated device/user identifier(s) 124 of the mobile device 106. For example, when the search provider 1212 provides services to the mobile device 106, it does so by identifying the mobile device 106 using one or more of the device/user identifier(s) 124. In this manner, the search provider 1212 can associate the search term(s) 1210 with the device/user identifier(s) 124 of the mobile device 106 indicating which searches are performed for the particular mobile device 106.

In the illustrated example, the app publisher 110 matches the device/user identifier(s) 124 from the collected data 1302 to the device/user identifier(s) 124 from the collected data 126 to determine that the search term(s) 1210 correspond to a search provided for the mobile device 106 associated with the device/user identifier(s) 124. The app publisher 110 of the illustrated example also generates an ACR ID 128 based on the device/user identifier(s) 124 as disclosed herein. The app publisher 110 then sends the user-interest data 1216, including the search term(s) 1210 and the associated ACR ID 128, to the AME 108. The AME 108 can then send the encrypted device/user identifier logs 136a-b to the partner database proprietors 104a-b to request the user information 102a-b as described above in connection with FIG. 1.

Figure 14:
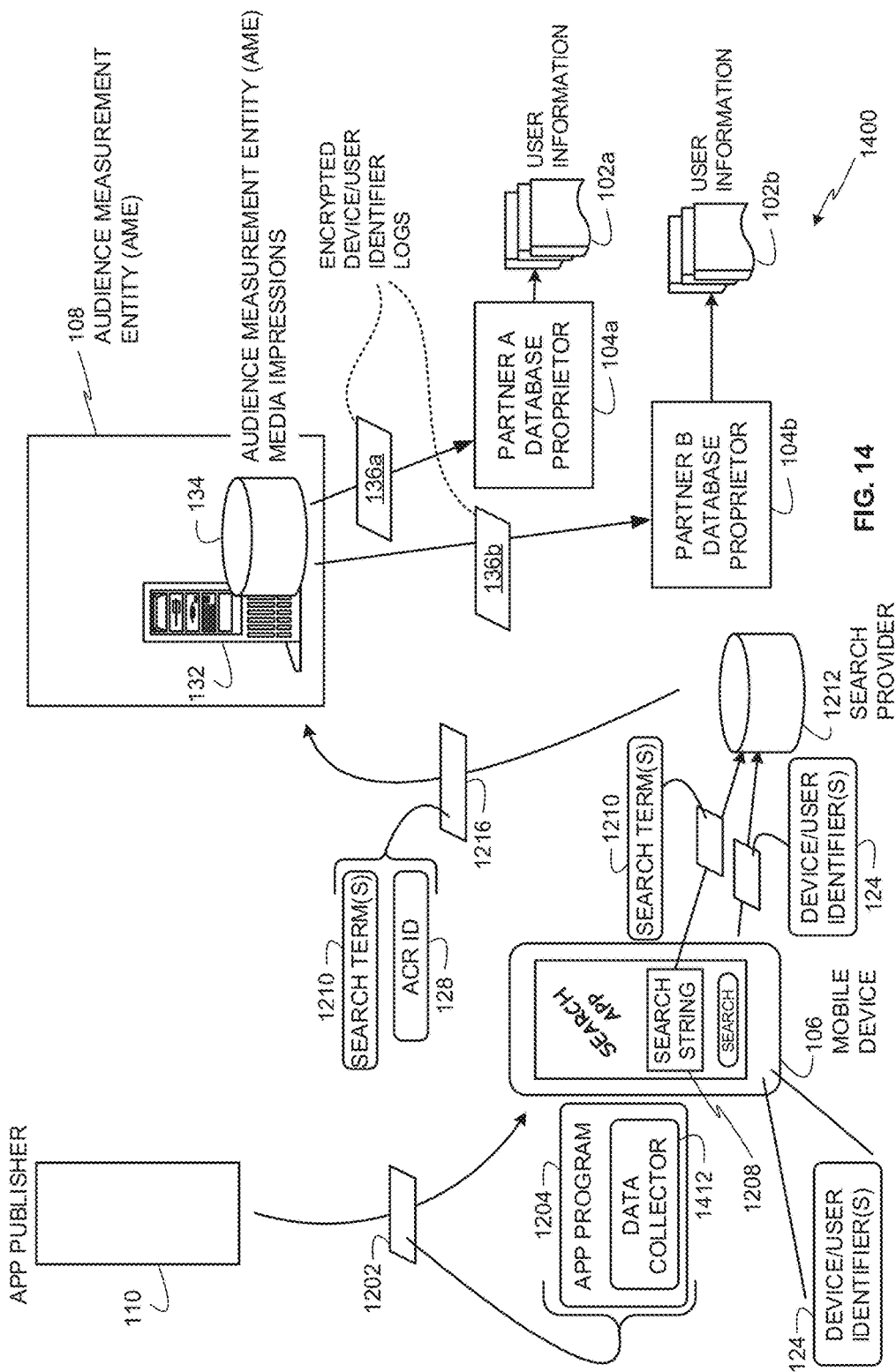
FIG. 14 depicts yet another example system to collect user information from distributed database proprietors for associating with search terms provided by users at mobile devices.

FIG. 14 depicts yet another example system 1400 to collect user information (e.g., the user information 102a and 102b) from distributed database proprietors 104a and 104b for associating with the search term(s) 1210 provided at the mobile device 106. In the illustrated example of FIG. 14, a data collector 1412 is shown as being located in the app program 1204. For example, the data collector 1412 may include instructions coded in the app program 1204 to collect data in the mobile device 106. Alternatively, the data collector 1412 may be a separate program downloaded separate from the app program 1204 as part of the app install package 1202 from the app publisher 110.

In the illustrated example of FIG. 14, the data collector 1412 is configured to collect the device/user identifier(s) 124 from the mobile device 106. The example data collector 1412 sends the device/user identifier(s) 124 to the search provider 1212. The data collector 1412 of the illustrated example does not collect the search term(s) 1210 from the search field 1208 at the mobile device 106 as the data collector 1206 does in the example system 1200 of FIG. 12. Instead, the search provider 1212 retrieves the search term(s) 1210 when received from the app program 1205 executing on the mobile device 106. The search provider 1212 then associates the search term(s) 1210 to the device/user identifier(s) 124 of the mobile device 106, and generates the ACR ID 128 based on the device/user identifier(s) 124 as disclosed herein. The search provider 1212 then sends the user-interest data 1216, including the search term(s) 1210 and the ACR ID 128, to the AME 108. For example, when the search provider 1212 provides search services to the mobile device 106, it does so by identifying the mobile device 106 using one or more of the device/user identifier(s) 124. In this manner, the search provider 1212 can associate the search term(s) 1210 with the device/user identifier(s) 124 and the ACR ID 128 of the mobile device 106 indicating that the search was performed for the particular mobile device 106. In other examples, the data collector 1412 at the mobile device 106 may be configured to send the search term(s) 1210 and the ACR ID 128 (or the device/user identifier(s) 124) as the user-interest data 1216 directly to the AME 108. In the illustrated example, after the AME 108 receives the user-interest data 1216 from the search provider 1212 (or from the mobile device 106), the AME 108 can then send the encrypted device/user identifier logs 136a-b to the partner database proprietors 104a-b to request the user information 102a-b as described above in connection with FIG. 1.

Although the search provider 1212 is shown separate from the app publisher 110 in FIGS. 1, 9, and 10, the app publisher 110 may implement at least some operations of the search provider 1212 to receive the search term(s) 1210 from the mobile device 106. For example, the data collector 1412 may send the search term(s) 1210 to the app publisher 110 so that the app publisher 110 may forward the search term(s) 1210 on to a search provider. In such examples, the app publisher 110 implements at least some of the operations described above as being performed by the search provider 1212.

Figure 2:
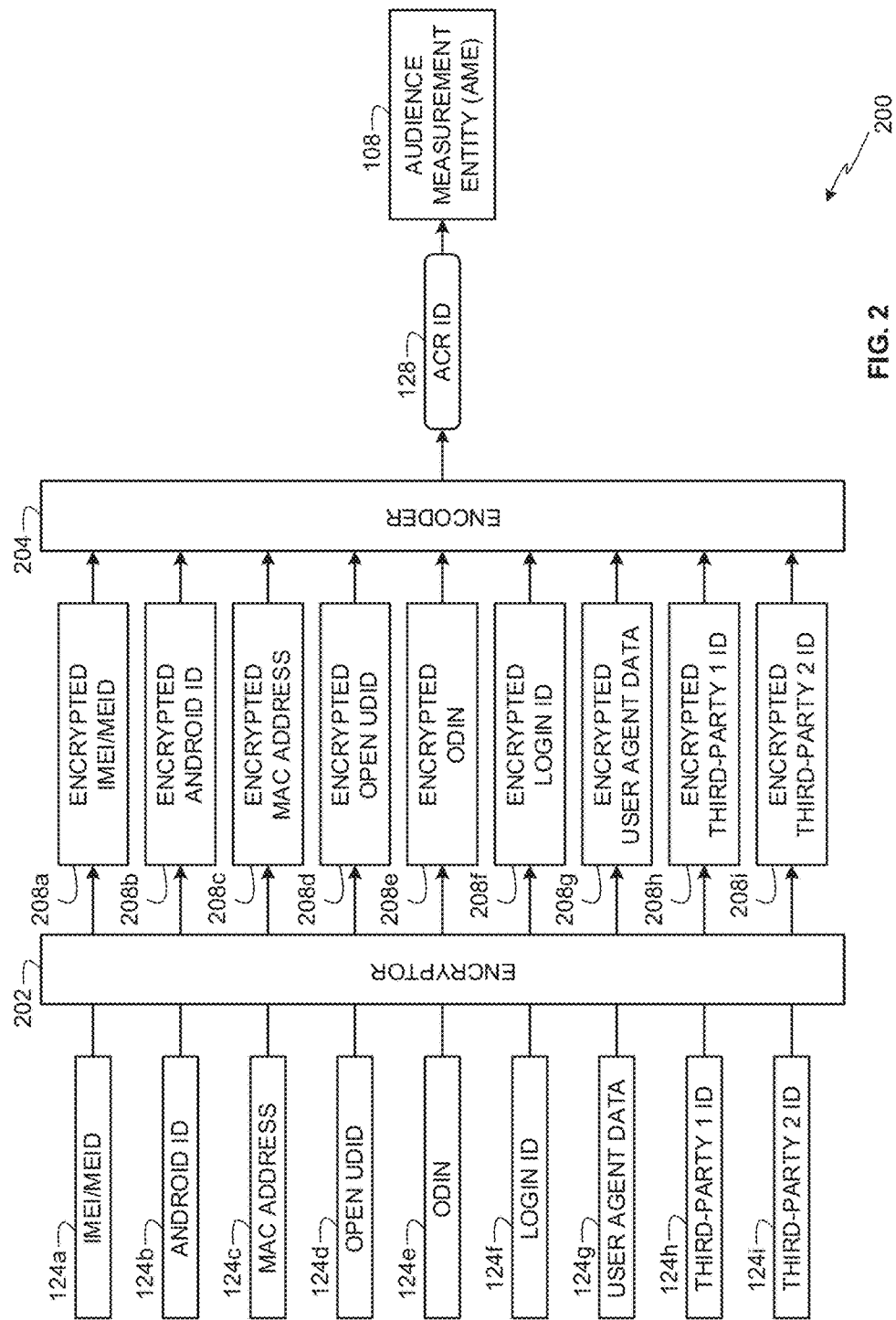
FIG. 2 depicts an example apparatus to encrypt device and/or user identifiers, and encode the encrypted device and/or user identifiers into an application campaign rating (ACR) identifier.

FIG. 2 depicts an example apparatus 200 having an encryptor 202 to encrypt device and/or user identifiers (e.g., the device/user identifier(s) 124 of FIG. 1), and having an encoder 204 to encode the encrypted device and/or user identifiers into an application campaign rating (ACR) identifier (e.g., the ACR ID 128 of FIGS. 1, 9, 10, and 12-14). The encryptor 202 of the illustrated example is provided with encryption keys and partner database proprietor identifiers corresponding to the different partner database proprietors (e.g., partner database proprietors 104a-b of FIGS. 1, 9, 10, and 12-14) for which device/user identifiers 124 (FIGS. 1, 9, 10, and 12-14) can be collected from mobile devices. In the illustrated example, device and/or user identifiers (e.g., the device/user identifier(s) 124 of FIGS. 1, 9, 10, and 12-14) include an IMEI/MEID number 124a, an Android ID 124b, a MAC address 124c, an OpenUDID 124*d*, an ODIN identifier 124*e*, a login ID 124*f*, user agent data 124*g*, a third-party 1 ID 124*h*, and a third-party 2 ID 124*i*. In the illustrated examples, the third-party 1 ID 124*h* and/or the third-party 2 ID 124*i* may be identifiers of targeted advertisement services, web analytics services, services that collect and store demographic information of users in association with unique identifiers (e.g., the third-party 1 ID 124*h* and/or the third-party 2 ID 124*i*) of those users. The encryptor 202 of the illustrated example uses corresponding encryption keys to encrypt the device/user identifiers 124 to corresponding encrypted device/user identifiers 208*a-i*. In addition, the encryptor 202 also provides (e.g., appends, prepends, or otherwise concatenates) corresponding partner database proprietor identifiers to corresponding ones of the encrypted device/user identifiers 208*a-i* so that the AME 108 can identify partner database proprietors (e.g., the partner database proprietors 104*a-b* of FIGS. 1, 9, 10, and 12-14) to which it should send corresponding ones of the encrypted device/user identifiers 208*a-i*. The encoder 204 of the illustrated example encodes the encrypted device/user identifiers 208*a-i* into the ACR ID 128. The ACR ID 128 is then sent to the AME 108.

The example apparatus 200 may be entirely or partially implemented at the mobile device 106 (FIGS. 1, 9, 10, and 12-14), entirely or partially implemented at the app publisher 110 (FIGS. 1, 9, 10, and 12-14) (or other collection entity), and/or entirely or partially implemented at the media publisher 120 (FIGS. 1, 9, and 10) (or search provider 1212 of FIGS. 12-14). In some examples, the encryptor 202 and the encoder 204 may both be implemented in the mobile device 106, to generate the ACR ID 128 and send the ACR ID 128 to the app publisher 110 (or other collection entity) in the collected data 126 along with the media ID 122 (and/or the search term(s) 1210). In other examples, the encryptor 202 may be implemented at the mobile device 106, and the encoder 204 may be implemented at the app publisher 110 (or other collection entity), at the media publisher 120, and/or at the search provider 1212. For example, the encryptor 202 may be provided in encryption software downloaded to the mobile device 106 as part of the data collector 112. In this manner, the encryptor 202 can encrypt the device/user identifier(s) 124 at the mobile device 106, and send the encrypted device/user identifier(s) 208*a-i* to the app publisher 110 (or other collection entity), to the media publisher 120, and/or to the search provider 1212. The encoder 204 can then be used at the app publisher 110 (or other collection entity), at the media publisher 120, and/or at the search provider 1212 to generate the ACR ID 128 by encoding the encrypted device/user identifier(s) 208*a-i* into the ACR ID 128, and the app publisher 110 (or other collection entity), the media publisher 120, and/or the search provider 1212 sends the ACR ID 128 to the AME 108 along with the media ID 122 (e.g., as the impression data 130 of FIGS. 1, 9, and 10) or the search term(s) 1210 (e.g., as the user-interest data 1216).

In other examples, both of the encryptor 202 and the encoder 204 are implemented at the app publisher 110 (or other collection entity), at the media publisher 120, and/or at the search provider 1212. In such other examples, the app publisher 110 (or other collection entity), the media publisher 120, and/or the search provider 1212 receive(s) the device/user identifier(s) 124 from the mobile device 106. The app publisher 110 (or other collection entity), the media publisher 120, and/or the search provider 1212 generate(s) the ACR ID 128 to include the encrypted device/user identifier(s) 208*a-i*. The app publisher 110 (or other collection entity), the media publisher 120, and/or the search provider 1212 can then send the ACR ID 128 to the AME 108 along with the media ID 122 (e.g., as the impression data 130 of FIGS. 1, 9, and 10) or the search term(s) 1210 (e.g., as the user-interest data 1216 of FIGS. 12-14).

Figure 3:
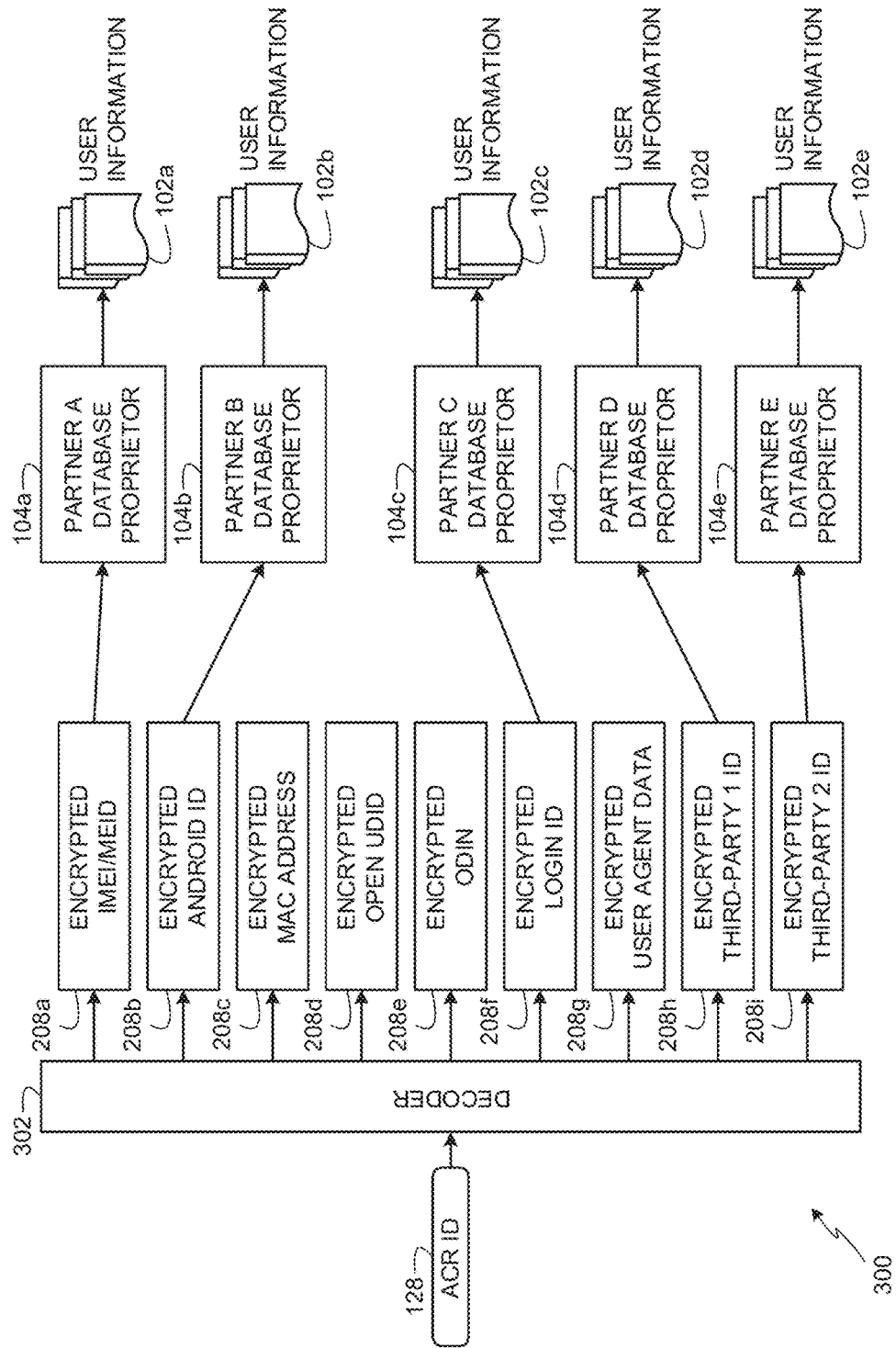
FIG. 3 depicts an example apparatus to decode encrypted device and/or user identifiers from the ACR identifier of FIG. 2, and send the encrypted device and/or user identifiers to corresponding database proprietors to request user information associated with the encrypted device and/or user identifiers.

FIG. 3 depicts an example apparatus 300 to decode encrypted device and/or user identifiers 208*a-i* (FIG. 2) from the ACR ID 128 of FIGS. 1, 2, 9, 10, and 12-14, and send one or more of the encrypted device and/or user identifiers 208*a-i* to corresponding partner database proprietors 104*a-e* to request user information 102*a-e* associated with the encrypted device and/or user identifiers 208*a-i*. The apparatus 300 of the illustrated example includes a decoder 302 to decode the encrypted device and/or user identifiers 208*a-i* from the ACR ID 128. In the illustrated examples, the decoder 302 is implemented at the AME 108 of FIG. 1 (e.g., at the server 132 of the AME 108). The decoder 302 of the illustrated example determines which of the partner database proprietors 104*a-e* correspond to which of the encrypted device/user identifiers 208*a-i* based on, for example, partner database proprietor identifiers provided to the encrypted device/user identifiers 208*a-i* by the encryptor 202 of FIG. 2. The decoder 302 then sends corresponding ones of the encrypted device and/or user identifiers 208*a-i* to corresponding partner database proprietors 104*a-e*.

Figure 4:
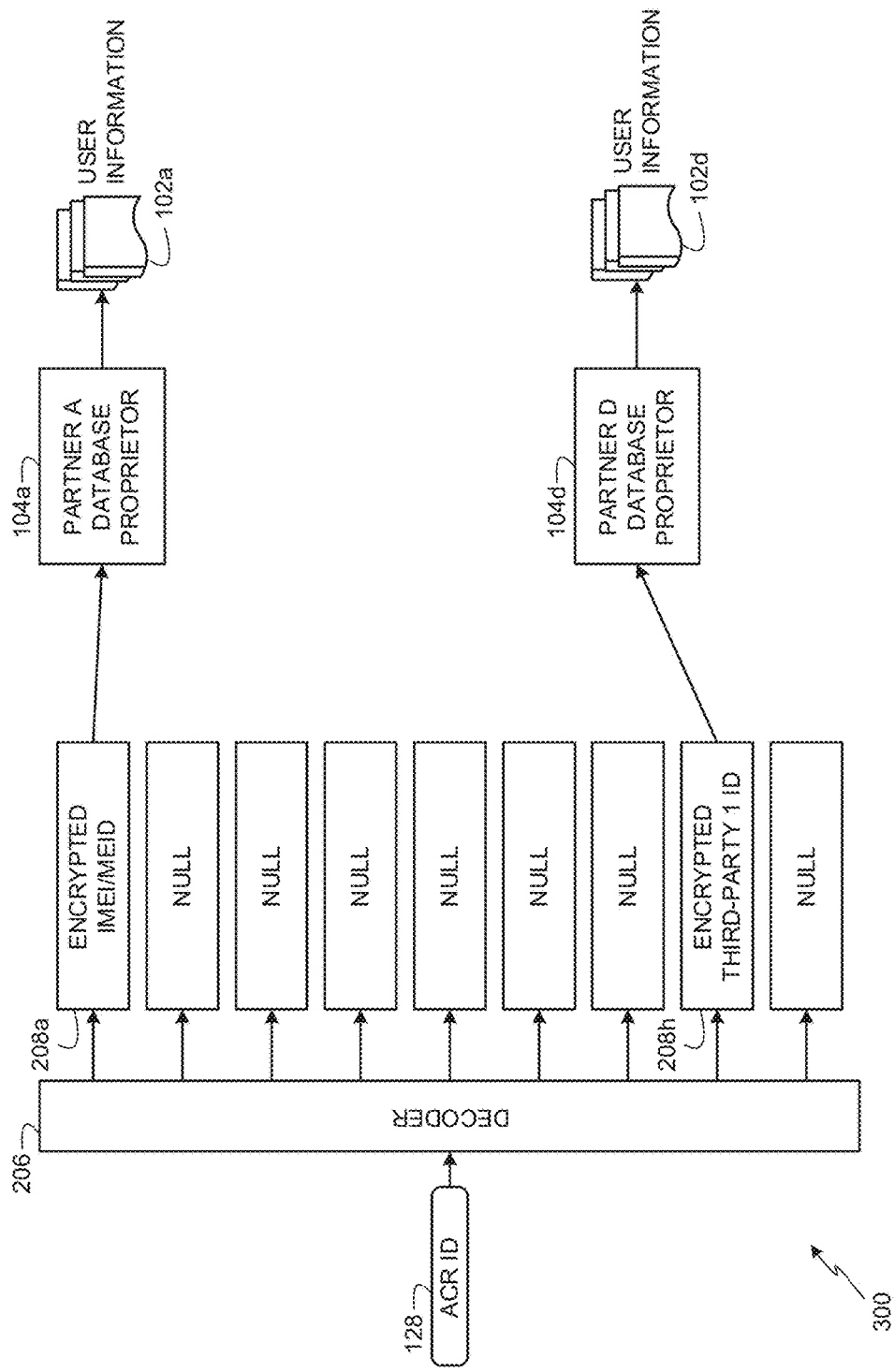
FIG. 4 depicts the example apparatus of FIG. 3 decoding an ACR identifier having some empty fields that do not contain any device and/or user identifiers.

FIG. 4 depicts the example apparatus 300 of FIG. 3 decoding the ACR ID 128 in an example in which the ACR ID 128 has some empty fields that do not contain any encrypted device and/or user identifiers. In the illustrated example of FIG. 4, the decoder 302 decodes the encrypted device and/or user identifiers 208*a* and 208*h* which are located in the ACR ID 128, sends the encrypted device and/or user identifier 208*a* to the corresponding partner database proprietor 104*a*, and sends the encrypted device and/or user identifier 208*h* to the corresponding partner database proprietor 104*h*. Thus, although nine encrypted device and/or user identifiers 208*a-i* are shown in FIG. 3, in some examples, fewer (e.g., less than nine) encrypted device and/or user identifiers may be located in the ACR ID 128 such as in FIG. 4. In yet other examples, more than nine encrypted device and/or user identifiers may be encoded into the ACR ID 128.

While example manners of implementing the apparatus 200 and the apparatus 300 have been illustrated in FIGS. 2-4, one or more of the elements, processes and/or devices illustrated in FIGS. 2-4 may be combined, divided, re-arranged, omitted, eliminated and/or implemented in any other way. Further, the example encryptor 202, the example encoder 204, the example decoder 302 and/or, more generally, the example apparatus 200 and/or 300 may be implemented using hardware, software, firmware and/or any combination of hardware, software and/or firmware. Thus, for example, any of the example encryptor 202, the example encoder 204, the example decoder 302 and/or, more generally, the example apparatus 200 and/or 300 could be implemented using one or more analog or digital circuit(s), logical circuit(s), programmable processor(s), application specific integrated circuit(s) (ASIC(s)), programmable logic device(s) (PLD(s)) and/or field programmable logic device(s) (FPLD(s)), etc. When reading any of the apparatus or system claims of this patent to cover a purely software and/or firmware implementation, at least one of the example encryptor 202, the example encoder 204, and/or the example decoder 302 is/are hereby expressly defined to include a tangible computer readable storage device or storage disk such as a memory, a digital versatile disk (DVD), a compact disk (CD), a Blu-ray disk, etc. storing the software and/or firmware. Further still, the example apparatus 200 of FIG. 2 and/or the example apparatus 300 of FIGS. 3 and 4 may include one or more elements, processes and/or devices in addition to, or instead of, those illustrated in FIGS. 2-4, and/or may include more than one of any or all of the illustrated elements, processes and devices.

FIGS. 5, 6, 7, 11, 15, 17, and 18 are flow diagrams representative of machine readable instructions that may be executed to track media impressions and/or search terms and collect distributed user information for the media impressions and/or search terms using examples disclosed herein. In the examples of FIGS. 5, 6, 7, 11, 15, 17, and 18, operations and processes are shown that represent machine readable instructions comprising one or more programs for execution by one or more processors such as the processor 812 shown in the example computer 800 discussed below in connection with FIG. 8. The program(s) may be embodied in software stored on a tangible computer readable storage medium such as a CD-ROM, a floppy disk, a hard drive, a digital versatile disk (DVD), a Blu-ray disk, or a memory associated with the processor 812, but the entire program(s) and/or parts thereof could alternatively be executed by a device other than processor(s) such as the processor 812 and/or embodied in firmware or dedicated hardware. Further, although the example program(s) is/are disclosed herein with reference to the illustrated examples of FIGS. 5, 6, 7, 11, 15, 17, and 18, many other methods of implementing example apparatus 200 and 300 disclosed herein may alternatively be used. For example, the order of execution of the processes and/or operations may be changed, and/or some of the processes and/or operations disclosed herein may be changed, eliminated, or combined.

As mentioned above, example processes and/or operations of FIGS. 5, 6, 7, 11, 15, 17, and 18 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, brief instances, for temporarily buffering, and/or for caching of the information). As used herein, the term tangible computer readable storage medium is expressly defined to include any type of computer readable storage device and/or storage disk and to exclude propagating signals and transmission media. As used herein, "tangible computer readable storage medium" and "tangible machine readable storage medium" are used interchangeably. Additionally or alternatively, the example processes and/or operations of FIGS. 5, 6, 7, 11, 15, 17, and 18 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and transmission media. As used herein, when the phrase "at least" is used as the transition term in a preamble of a claim, it is open-ended in the same manner as the term "comprising" is open ended.

Figure 5:
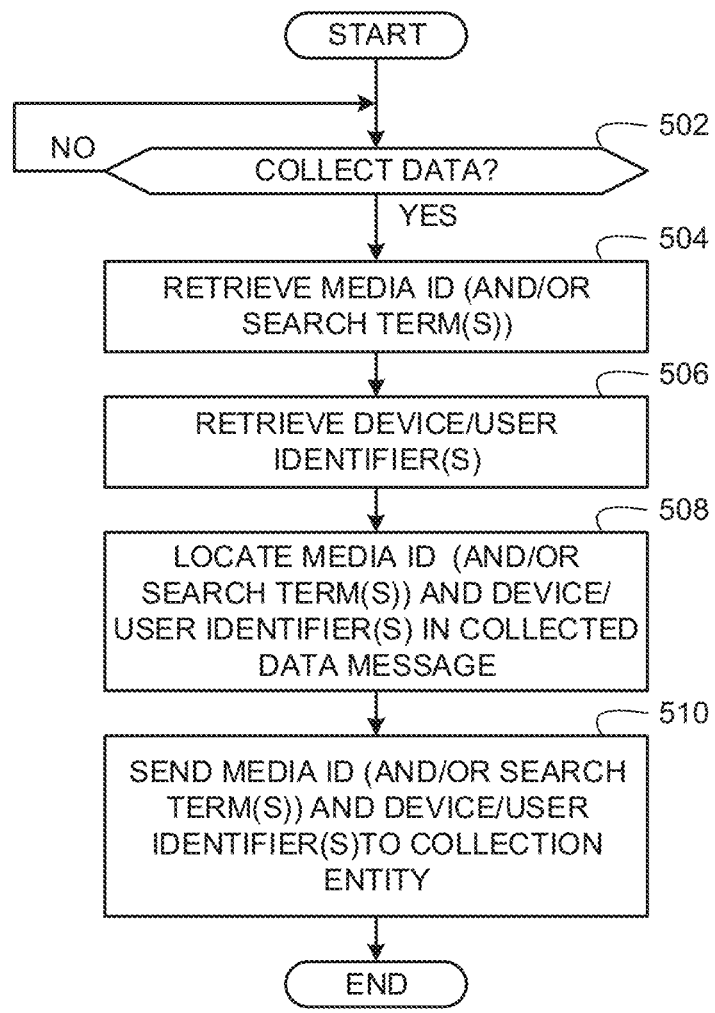
FIG. 5 is a flow diagram representative of example machine readable instructions that may be executed to collect media identifiers and device and/or user identifiers at mobile devices.

FIG. 5 is a flow diagram of an example process that may be used to collect media identifiers (e.g., the media ID 122 of FIG. 1) and device and/or user identifiers (e.g., the device/user identifiers 124 of FIGS. 1 and 2) at mobile devices (e.g., the mobile device 106 of FIG. 1). In some examples, instead of or in addition to collecting media identifiers, the example process of FIG. 5 may additionally or alternatively be used to collect search terms (e.g., the search term(s) 1210 of FIG. 12). In the illustrated example, the example process of FIG. 5 is performed at the mobile device 106. However, the example process of FIG. 5 may be performed at any other device.

Initially, the data collector 112 (FIG. 1) determines whether it should collect data (block 502). For example, the app program 116 (FIG. 1) may trigger the data collector 112 to collect data when the app program 116 presents media (e.g., the media 118 of FIG. 1) or receives one or more search term(s) (e.g., the search term(s) 1210 of FIGS. 12-14). When the data collector 112 determines at block 502 that it should collect data, the data collector 112 retrieves the media ID 122 from the media 118, and/or the search term(s) 1210 (block 504). The data collector 112 also collects one or more of the device/user identifier(s) 124 from the mobile device 106 (block 506). The data collector 112 locates the media ID 122, and/or the search term(s) 1210, and the device/user identifier(s) 124 in a collected data message (e.g., the collected data 126 of FIG. 1 and/or the collected data 1214 of FIG. 12) (block 508). The data collector 112 sends the media ID 122, and/or the search term(s) 1210, and the device/user identifier(s) 124 to a collection entity (block 510). For example, the data collector 112 sends the media ID 122, and/or the search term(s) 1210, and the device/user identifier(s) 124 as the collected data 126 (FIG. 1) and/or 1214 (FIG. 12) to the apps publisher 110 of FIG. 1. The example process of FIG. 5 then ends.

In some examples in which the encryptor 202 of FIG. 2 is provided in the data collector 112, the encryptor 202 encrypts the device/user identifier(s) 124 at block 508 to generate one or more of the encrypted device/user identifier(s) 208a-i of FIG. 2. In such some examples, the data collector 112 locates the encrypted device/user identifier(s) 208a-i and the media ID 122, and/or the search term(s) 1210, in the collected data 126 and/or 1214 at block 508. In some examples in which the encoder 204 is also provided in the data collector 112, the encoder 204 generates the ACR ID 128 of FIGS. 1-4 by encoding the encrypted device/user identifier(s) 208a-i into the ACR ID 128 at block 508. In such some examples, the data collector 112 locates the ACR ID 128 and the media ID 122, and/or the search term(s) 1210, in the collected data 126 and/or 1214 at block 508. An example process that may be used to encrypt the device/user identifier(s) 124 and encode the encrypted device/user identifiers 208a-i is described below in connection with FIG. 6.

Figure 11:
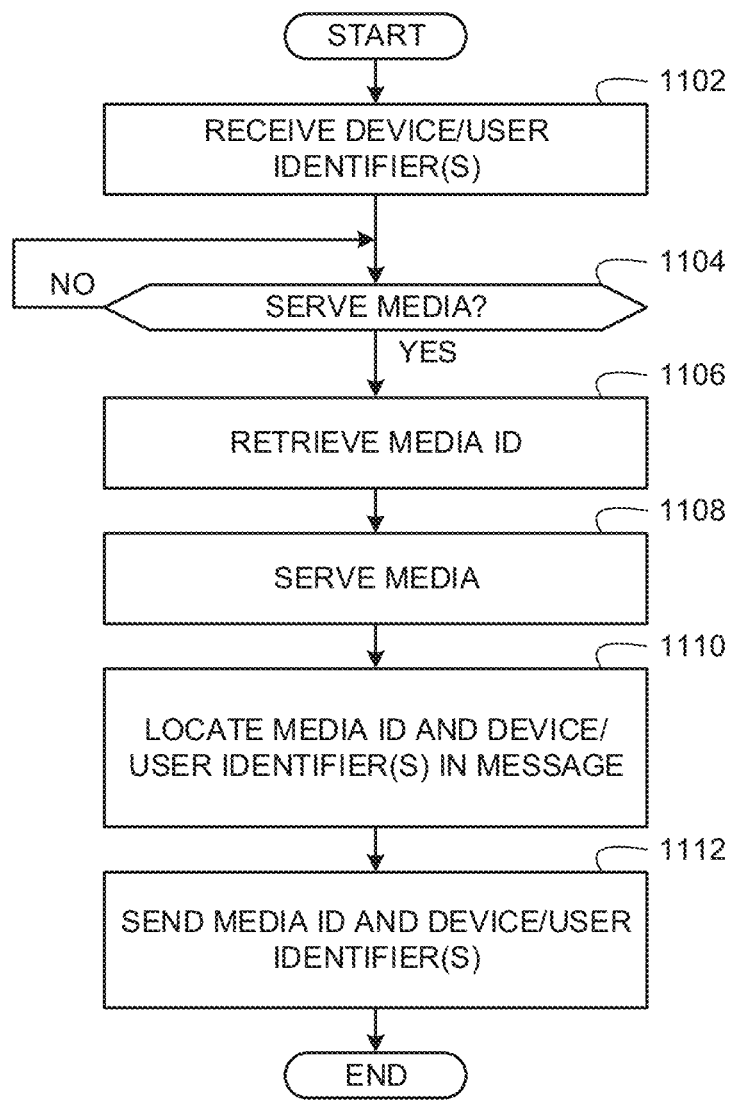
FIG. 11 is a flow diagram representative of example machine readable instructions that may be executed by the example media publisher of FIGS. 1, 9, and/or 10 to collect media identifiers and device and/or user identifiers at a media publisher.

FIG. 11 is a flow diagram of an example process that may be used to collect media identifiers (e.g., the media ID 122 of FIGS. 1, 9, and 10) and device and/or user identifiers (e.g., the device/user identifier(s) 124 of FIGS. 1, 9, and 10) at a media publisher (e.g., the media publisher 120 of FIGS. 1, 9, and 10). In the illustrated example, the example process of FIG. 11 is performed by a processor system (e.g., a server) at the media publisher 120 in connection with the example system 900 of FIG. 9 and/or the example system 1000 of FIG. 10. However, the example process of FIG. 11 may be performed by any other device.

Initially, the media publisher 120 receives the device/user identifier(s) 124 (block 1102) from, for example, the data collector 912 of FIG. 9 or the data collector 1012 of FIG. 10.

For example, the media publisher 120 may receive the device/user identifier(s) 124 in an HTTP header of an HTTP request from the mobile device 106. The media publisher 120 determines whether it should serve media (e.g., the media 118 of FIGS. 9 and 10) (block 1104) to, for example, the mobile device 106. For example, the media publisher 120 may receive a media serve request from the mobile device 106 that was generated by the app program 116 when executing on the mobile device 106. In the illustrated example, the media serve request is a request to serve an advertisement or other media to the mobile device 106 for presenting while the app program 116 is executing. In some examples, the media serve request is received at block 1102 when the media publisher 120 receives the device/user identifier(s) 124. For example, media publisher 120 may receive the media serve request from the mobile device 106 in the HTTP request that includes the device/user identifier(s) 124 in its HTTP header. Other protocols, such as HTTPS, may additionally or alternatively be used.

When the media publisher 120 determines at block 1104 that it should serve media (e.g., the media 118), the media publisher 120 retrieves the media ID 122 from the media 118 to be served (block 1106). The media publisher 120 serves the media 118 (block 1108). For example, the media publisher 120 may use one or more of the device/user identifier(s) 124 received at block 1102 to identify the mobile device 106 as a receiving device of the served media 118. The media publisher 120 locates the media ID 122 and the device/user identifier(s) 124 in a message (block 1110). For example, in the example system 900 of FIG. 9, the media publisher 120 locates the media ID 122 and the device/user identifier(s) 124 in the collected data message 902. Alternatively, in the example system 1000 of FIG. 10 in which the apparatus 200 of FIG. 2 is implemented at the media publisher 120, the media publisher 120 generates the ACR ID 128 (FIGS. 10 and 2) based on the device/user identifier(s) 124, and locates the media ID 122 and the ACR ID 128 in the impression data 130 at block 1110. The media publisher 120 sends the media ID 122 and the device/user identifier(s) 124 (block 1112), for example, as the collected data 902 to the app publisher 110 as shown in FIG. 9, or as the impression data 130 to the AME 108 as shown in FIG. 10. The example process of FIG. 11 then ends.

Figure 15:
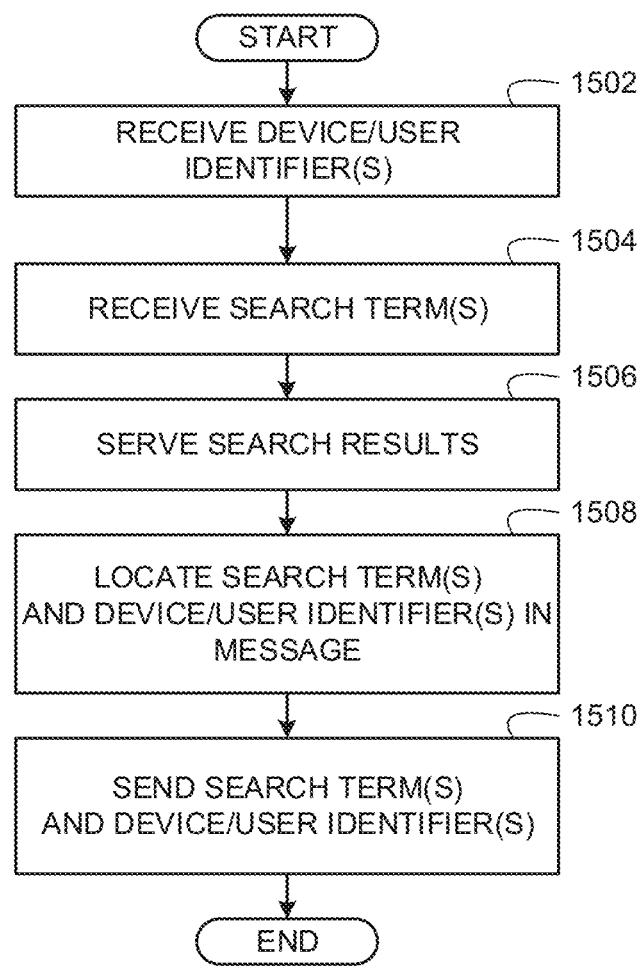
FIG. 15 is a flow diagram representative of example machine readable instructions that may be executed by the example search provider of FIGS. 12, 13, and/or 14 to collect search terms and device and/or user identifiers at a search provider.

FIG. 15 is a flow diagram of an example process that may be executed to collect search terms (e.g., the search term(s) 1210 of FIGS. 12-14) and device and/or user identifiers (e.g., the device/user identifiers 124 of FIGS. 12-14) at a search provider (e.g., the search provider 1212 of FIGS. 12-14). In the illustrated example, the example process of FIG. 15 is performed by a processor system (e.g., a server) at the search provider 1212 in connection with the example system 1300 of FIG. 13 and/or the example system 1400 of FIG. 14. However, the example process of FIG. 15 may be performed by any other device.

Initially, the search provider 1212 receives the device/user identifier(s) 124 (block 1502) from, for example, the data collector 1312 of FIG. 13 or the data collector 1412 of FIG. 14. For example, the search provider 1212 may receive the device/user identifier(s) 124 in an HTTP header of an HTTP request from the mobile device 106. The search provider 1212 receives the search term (s) 1210 from the app program 1204 (block 1504). The search provider 1212 serves search results (block 1506). For example, the search provider 1212 may use one or more of the device/user identifier(s) 124 received at block 1502 to identify the mobile device 106 as a receiving device of the search results. The search provider 1212 locates the search term(s) 1210 and the device/user identifier(s) 124 in a message (block 1508). For example, in the example system 1300 of FIG. 13, the search provider 1212 locates the search term(s) 1210 and the device/user identifier(s) 124 in the collected data message 1302. Alternatively, in the example system 1400 of FIG. 14 in which the apparatus 200 of FIG. 2 is implemented at the search provider 1212, the search provider 1212 generates the ACR ID 128 (FIGS. 14 and 2) based on the device/user identifier(s) 124, and locates the search term(s) 1210 and the ACR ID 128 in the user-interest data 1216 at block 1508. The search provider 1212 sends the search term(s) 1210 and the device/user identifier(s) 124 (block 1510), for example, as the collected data 1302 to the app publisher 110 as shown in FIG. 13, or as the user-interest data 1216 to the AME 108 as shown in FIG. 14. The example process of FIG. 15 then ends.

Figure 6:
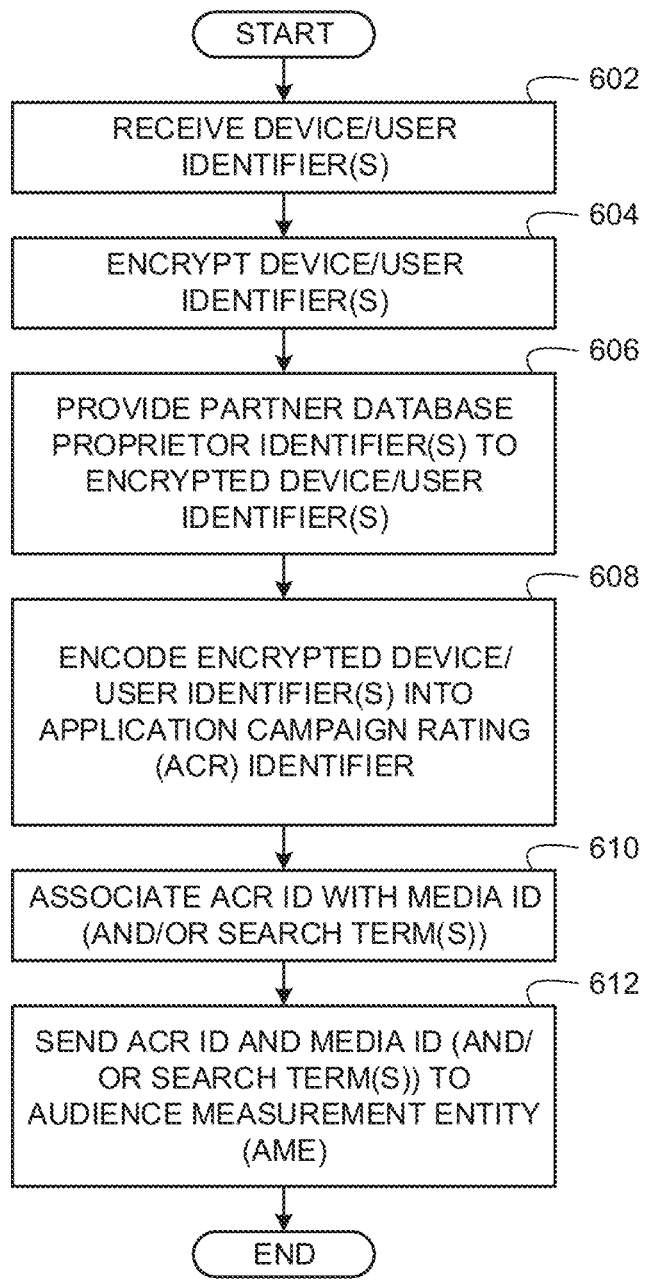
FIG. 6 is a flow diagram representative of example machine readable instructions that may be executed to encrypt device and/or user identifiers, and encode the encrypted device and/or user identifiers into the ACR identifier of FIG. 2.

FIG. 6 is a flow diagram of an example process to encrypt device and/or user identifiers (e.g., the device/user identifier(s) 124 of FIGS. 1 and 2), and to encode encrypted device and/or user identifiers (e.g., the encrypted device/user identifier(s) 208a-i of FIGS. 2-4) into the ACR ID 128 of FIGS. 1-4. The example process of FIG. 6 may be performed wholly or partially at the app publisher 110 of FIGS. 1, 9, and 10 (or another collection entity), wholly or partially at the mobile device 106 (e.g., at block 508 of the example process of FIG. 5), wholly or partially at the media publisher 120 of FIGS. 1, 9, and 10, and/or wholly or partially at the search provider 1212 of FIGS. 12-14. In some examples, operations performed by the encryptor 202 (FIG. 2) may be performed at the mobile device 106, and operations performed by the encoder 204 (FIG. 2) may be performed at the app publisher 110, at the media publisher 120, and/or at the search provider 1212.

Initially, the encryptor 202 (FIG. 2) receives one or more of the device/user identifier(s) 124 (FIGS. 1 and 2) (block 602). The encryptor 202 encrypts the device/user identifier(s) 124 (block 604) to generate the encrypted device/user identifier(s) 208a-i (FIG. 2). In the illustrated example, the encryptor 202 provides corresponding partner database proprietor identifiers to corresponding ones of the encrypted device/user identifier(s) 208a-i (block 606), for example, by appending, prepending, concatenating, or otherwise associating the partner database proprietor identifiers to or with the encrypted device/user identifier(s) 208a-i so that the partner database proprietor identifiers are accessible to the AME 108 without decrypting the encrypted device/user identifier(s) 208a-i. The encoder 204 (FIG. 2) encodes the encrypted device/user identifier(s) 208a-i into the ACR ID 128 (block 608). In the illustrated example, the encoder 204 associates the ACR ID 128 with the corresponding media ID 122, and/or the search term(s) 1210 (block 610). The encoder 204 sends the ACR ID 128 and the media ID 122, and/or the search term(s) 1210, to the AME 108 (block 612), for example, in the impression data 130 (FIGS. 1, 9, and 10). In some examples, the media ID 122 and/or the search term(s) 1210 are encrypted prior to transmission. The example process of FIG. 6 then ends.

Figure 7:
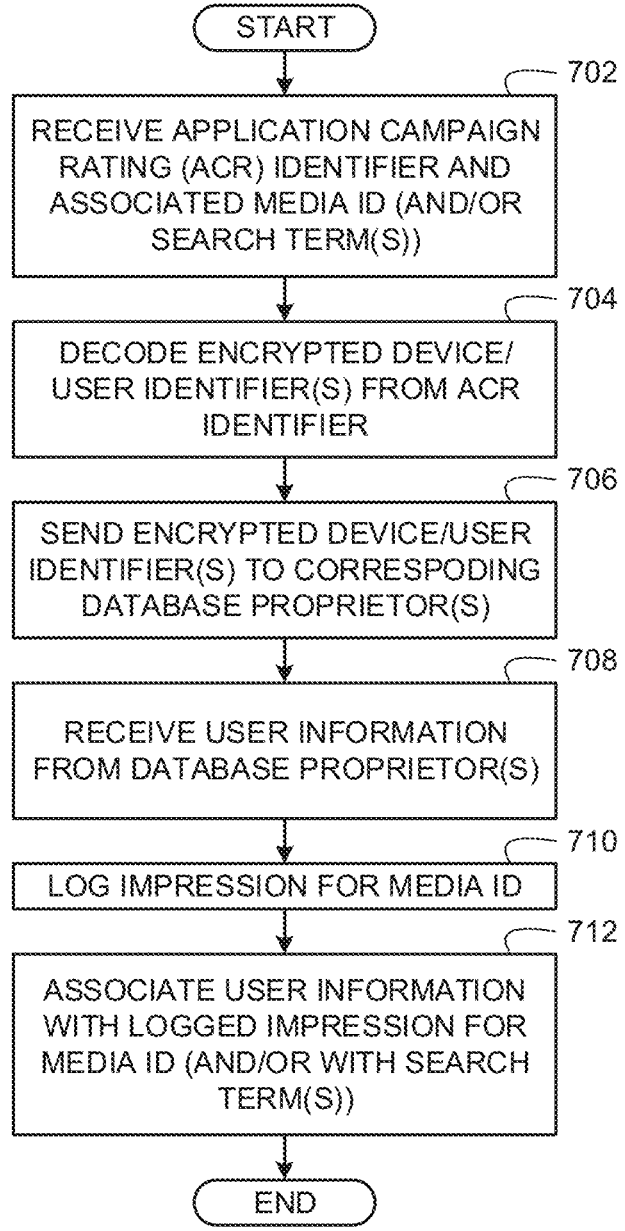
FIG. 7 is a flow diagram representative of example machine readable instructions that may be executed to decode encrypted device and/or user identifiers from the ACR identifier of FIG. 2, and collect user information associated with the encrypted device and/or user identifiers from corresponding database proprietors.

FIG. 7 is a flow diagram of an example process that may be used to decode encrypted device and/or user identifiers (e.g., the encrypted device/user identifiers 208a-i of FIGS. 2-4) from the ACR ID 128 of FIGS. 1-4, and collect user information associated with the encrypted device and/or user identifiers from one or more corresponding partner database proprietor(s) (e.g., one or more of the partner database proprietors 102a-e of FIGS. 1, 3, and 4). The example process of FIG. 7 may be performed at the AME 108 (FIG. 1), for example, by the server 132 (FIG. 1).

Initially, the server 132 receives the ACR ID 128 and the associated media ID 122, and/or the search term(s) 1210 (block 702). For example, the server 132 may receive the ACR ID 128 and the media ID 122 in the impression data 130 from the app publisher 110, from the media publisher 120, and/or from the mobile device 106 of FIGS. 1, 9, and 10. Additionally or alternatively, the server 132 may receive the ACR ID 128 and the search term(s) 1210 in the user-interest data 1216 from the app publisher 110, from the search provider 1212, and/or from the mobile device 106 of FIGS. 12-14. The decoder 302 (FIGS. 3 and 4) decodes one or more of the encrypted device/user identifier(s) 208a-i from the ACR ID 128 (block 704). The decoder 302 sends corresponding ones of the encrypted device/user identifier(s) 208a-i to corresponding ones of the partner database proprietor(s) 102a-e (block 706), for example, based on partner database proprietor identifiers provided to or associated with the encrypted device/user identifiers 208a-i by the encryptor 202 of FIG. 2 at block 606 of FIG. 6. The server 132 receives one or more of the user information 102a-e from one or more of the partner database proprietor(s) 102a-e (block 708). The server 132 logs a media impression for the media ID 122 (block 710). In addition, the server 132 associates the user information from at least one of the one or more user information 102a-e with the logged impression for the media ID 122, and/or with the search term(s) 1210 (block 712). The example process of FIG. 7 then ends.

Figure 16:
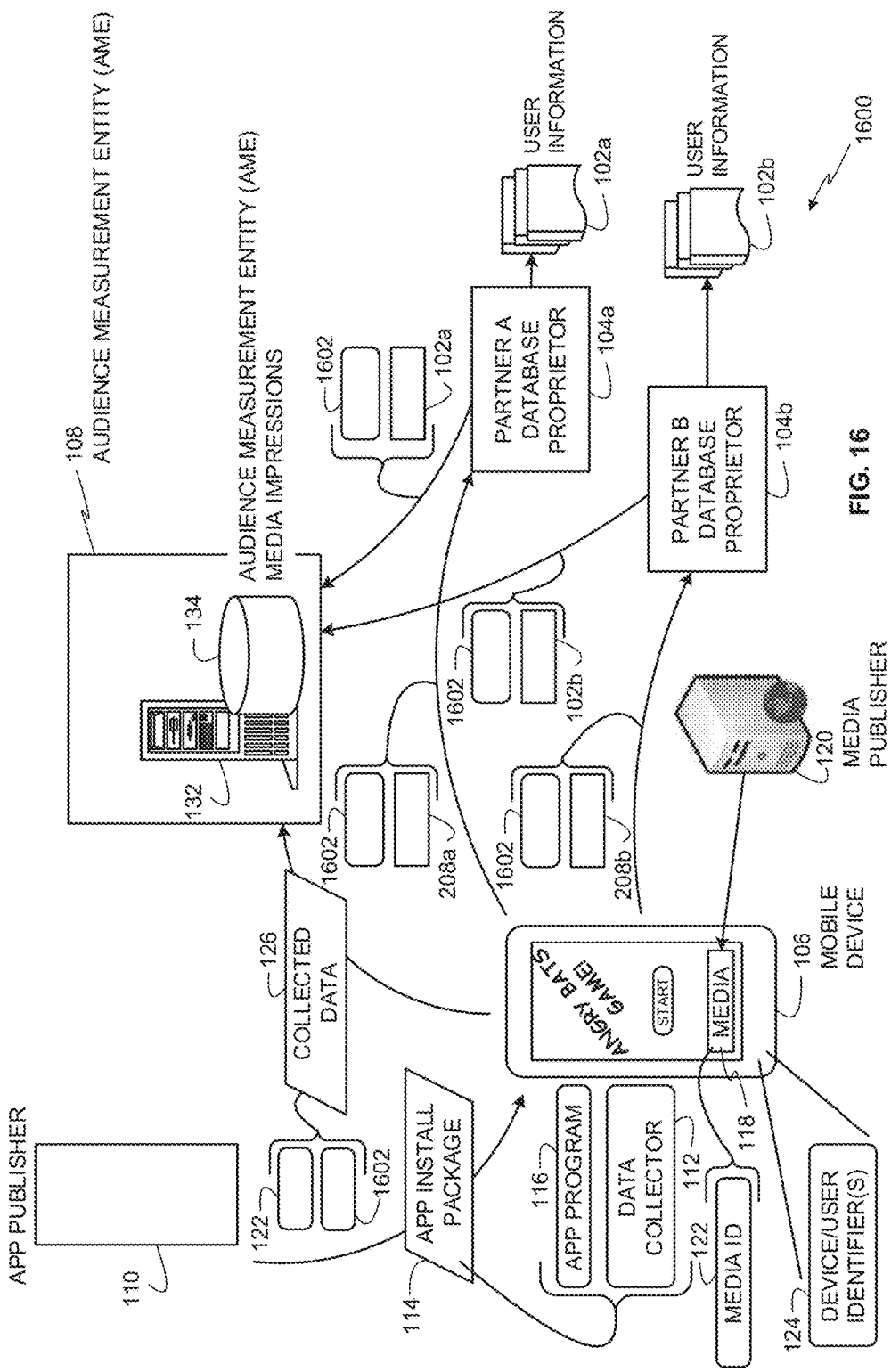
FIG. 16 depicts another example system to collect user information from distributed database proprietors for associating with impressions of media presented at mobile devices.

FIG. 16 depicts another example system 1600 to collect user information from distributed database proprietors 104a, 104b for associating with impressions of media presented at mobile devices 106. FIG. 16 illustrates a computing environment including the example database proprietors 104a, 104b, the example mobile device 106, the example audience measurement entity 108, the example application publisher 110, and the example media publisher 120 described above.

In contrast with the examples described above in which the mobile device 106 sends encrypted identifiers to the audience measurement entity 108 (e.g., via the application publisher 110, the media publisher 120, the search provider 1212, and/or another entity), in the example of FIG. 16 the mobile device 106 (e.g., the data collector 112 installed on the mobile device 106) sends the encrypted identifiers 208a, 208b directly to the respective database proprietors 104a, 104b (e.g., not via the AME 108). The example mobile device 106 of FIG. 16 sends the media identifier 122 to the audience measurement entity 108 (e.g., directly or through an intermediary such as via the application publisher 110), but does not send the media identifier 122 to the database proprietors 104a-b.

To perform the encryption of the user/device identifiers 124 and to generate the encrypted identifiers 208, the example mobile device 106 of FIG. 16 includes the encryptor 202 of FIG. 2. As described above with reference to FIG. 2, the example encryptor 202 generates an encrypted identifier 208a for the Partner A database proprietor 104a using an encryption key corresponding to a decryption key possessed by the Partner A database proprietor 104a. The decryption key possessed by the Partner A database proprietor 104a is useable to decrypt only encrypted identifiers 208a pertaining to its services.

The example Partner A database proprietor 104a decrypts the encrypted identifier 208a from the mobile device 106 to generate corresponding user information 102a. The Partner A database proprietor 104a looks up its user(s) corresponding to the decrypted device/user identifier, and collects corresponding user information 102a for those user(s) for sending to the AME 108. For example, if the partner database proprietor 104a is a wireless service provider, the encrypted device/user identifier 208a includes IMEI numbers, and the wireless service provider accesses its subscriber records to find user(s) having an IMEI numbers matching the IMEI numbers received in the encrypted device/user identifier 208a. When the user(s) are identified, the wireless service provider copies the user(s)' user information to the user information 102a for delivery to the AME 108. Similarly, the example Partner B database proprietor decrypts the encrypted identifier 208b (received from the mobile device 106) to generate corresponding user information 102b. The example partner database proprietors 104a-b provide the user information 102a-b to the example AME 108.

In the example of FIG. 16, the mobile device 106 also provides collected data 126 including the media identifier 122 to the example AME 108 (or to another collection entity). The server 132 at the example AME 108 logs a media impression for the media ID 122 and associates the user information from at least one of the one or more user information 102a-b with the logged impression for the media ID 122.

As mentioned above, the example partner database proprietors 104a-b provide the user information 102a-b to the example AME 108 for matching with the media identifier 122 to form media impression information. As also mentioned above, the database proprietors 104a-b are not provided copies of the media identifier 122. Instead, the database proprietors 104a-b are provided an impression identifier 1602 which uniquely identifies an impression event, but does not in and of itself identify the media associated with that event. To match the user information 102a-b with the media identifier 122, the example partner database proprietors 104a-b provide the user information 102a-b to the AME 108 in association with the impression identifier 1602 for the impression event that triggered the collection of the user information 102a-b. The impression identifier 1602 can additionally be used for reducing or avoiding duplication of demographic information. For example, the example partner database proprietors 104a-b may provide the user information 102a-b and the impression identifier 1602 to the AME 108 on a per-impression basis (e.g., each time a mobile device 106 sends a request including an encrypted identifier 208a-b and an impression identifier 1602 to the partner database proprietor 104a-b) and/or on an aggregated basis (e.g., send a set of user information 102a-b, which may include indications of multiple impressions at a mobile device 102a-b (e.g., multiple impression identifiers 1602), to the AME 108 presented at the mobile device 106).

The impression identifier 1602 provided to the AME 108 enables the AME 108 to distinguish unique impressions and avoid overcounting a number of unique users and/or devices viewing the media. For example, the relationship between the user information 102a from the partner A database proprietor 104a and the user information 102b from the partner B database proprietor 104b for the mobile device 106 is not readily apparent to the AME 108. By including an impression identifier 1602 (or any similar identifier), the example AME 108 can associate user information and avoid overcounting mobile devices and/or users (e.g., by only counting unique users instead of counting the same user multiple times).

A same user may be counted multiple times if, for example, an impression causes the mobile device 106 to send multiple encrypted user/device identifiers 208a-b to multiple different database proprietors 104a-b without an impression identifier. A first one of the database proprietors 104a sends first user information 102a to the AME 108, which signals that an impression occurred. A second one of the database proprietors 104b sends second user information 102b to the AME 108, which signals (separately) that an impression occurred. Separately, the mobile device 106 sends an indication of an impression to the AME 108. Without knowing that the user information 102a-b is from the same impression, the AME 108 has an indication of a single impression from the mobile device 106 and an indication of multiple impressions from the database proprietors 104a-b. To handle the discrepancy, the AME 108 may apply inappropriate corrective policies such as, for example, assume that impression information from the mobile device 106 was not properly received.

After looking up the respective user information 102a-b, the example partner database proprietors 104a-b transmit the impression identifier 1602 to the AME 108 with this respective user information 102a-b. The AME 108 matches the impression identifier 1602 obtained directly from the mobile device 106 to the impression identifier 1602 received from the database proprietors 104a-b with the user information 102a-b to thereby associate the user information 102a-b to the media identifier 122 and generate impression information. This is possible because the AME 108 received the media identifier 122 in association with the impression identifier 1602 directly from the mobile device 106. Therefore, the AME 108 can map user data from 2 or more database proprietors 104a-b to the same media exposure event, thus avoiding double counting.

In the example of FIG. 16, each unique impression identifier 1602 is associated with a specific impression of media on the mobile device 106. The partner database proprietors 104a-b receive the respective encrypted user identifiers 208a-b and generate the user information 102a-b independently (e.g., without regard to others of the partner database proprietors 104a-b) and without knowledge of the media identifier 122 involved in the impression. Without an indication that a piece of user information 102a (received from the partner database proprietor 104a) is associated with (e.g., the result of) the same impression at the mobile device 106 as a piece of user information 102b (received from the partner database proprietor 104b independently of the user information 102a received from the partner database proprietor 104a), without reference to the impression identifier 1602, the AME 108 would have no way to associate the user information 102a with the user information 102b and/or cannot determine that the different pieces of user information 102a-b are associated with a same impression and could, therefore, count the user information 102a-b as 2 different users/devices and/or 2 different impressions.

In examples in which the impression identifier 1602 is not used, the example AME 108 may still have the volumetric information indicative of the number of impressions of media, but may need to perform statistical analysis and/or de-duplication to estimate a number of unique users represented by a given set of potentially partially overlapping user information 102a-b.

The example mobile device 106 of FIG. 16 may perform the operations described above based on instructions provided in or with media from the media publisher 120. For example, the AME 108 may provide instructions to the media publisher 120 to cause the media publisher 120 to embed instructions in the media 118. When an impression of the media 118 occurs at the mobile device 106, the example mobile device 106 collects a media identifier 122 indicative of media presented at the mobile device 106. The instructions cause the example mobile device 106 to encrypt a user identifier that identifies the user of the mobile device 106. The encrypting of the user identifier is based on a first encryption key corresponding to a first database proprietor having first user information associated with the user identifier, and/or to encrypt a device identifier that identifies the mobile device. 106. The encrypting of the device identifier may be, for example, based on a second encryption key corresponding to a second database proprietor having second user information associated with the device identifier. The instructions cause the example mobile device 106 to send the media identifier 122 to the AME 108 in association with a unique impression identifier 1602. The instructions cause the mobile device 106 to send the encrypted user identifier (e.g., the encrypted identifier 208a) to a second server associated with the first database proprietor 104a and/or send the encrypted device identifier (e.g., the encrypted identifier 208b) in association with the same impression identifier 1602 to a third server associated with the second database proprietor 104b. Since all of the AME 108, the first database proprietor 104a, and the second database proprietor 104b receive the same impression identifier 1602, the AME 108 can later match the collected data to the same user/device.

Significantly, if the first database proprietor 104a (e.g., Facebook) provides demographic information about a user and the second database proprietor 104b (e.g., Verizon) provides second demographic and/or device type data associated with a device characteristic and demographic of a subscriber using the device, the AME 108 is able to use the impression identifier 1602 to associate specific demographic characteristics as well as with specific media accesses (e.g., users of iPhone™ 5's in the 20-30 year age range, and who are male, comprised 60% of the audience that accessed video reviews of the board game Russian Railroads™ on the web site boardgamegeek.com.

While the example of FIG. 16 is described with reference to media and media identifiers, the example of FIG. 16 may additionally or alternatively provide search terms to the AME 108 and/or to the partner database proprietors 102a-b.

Figure 17:
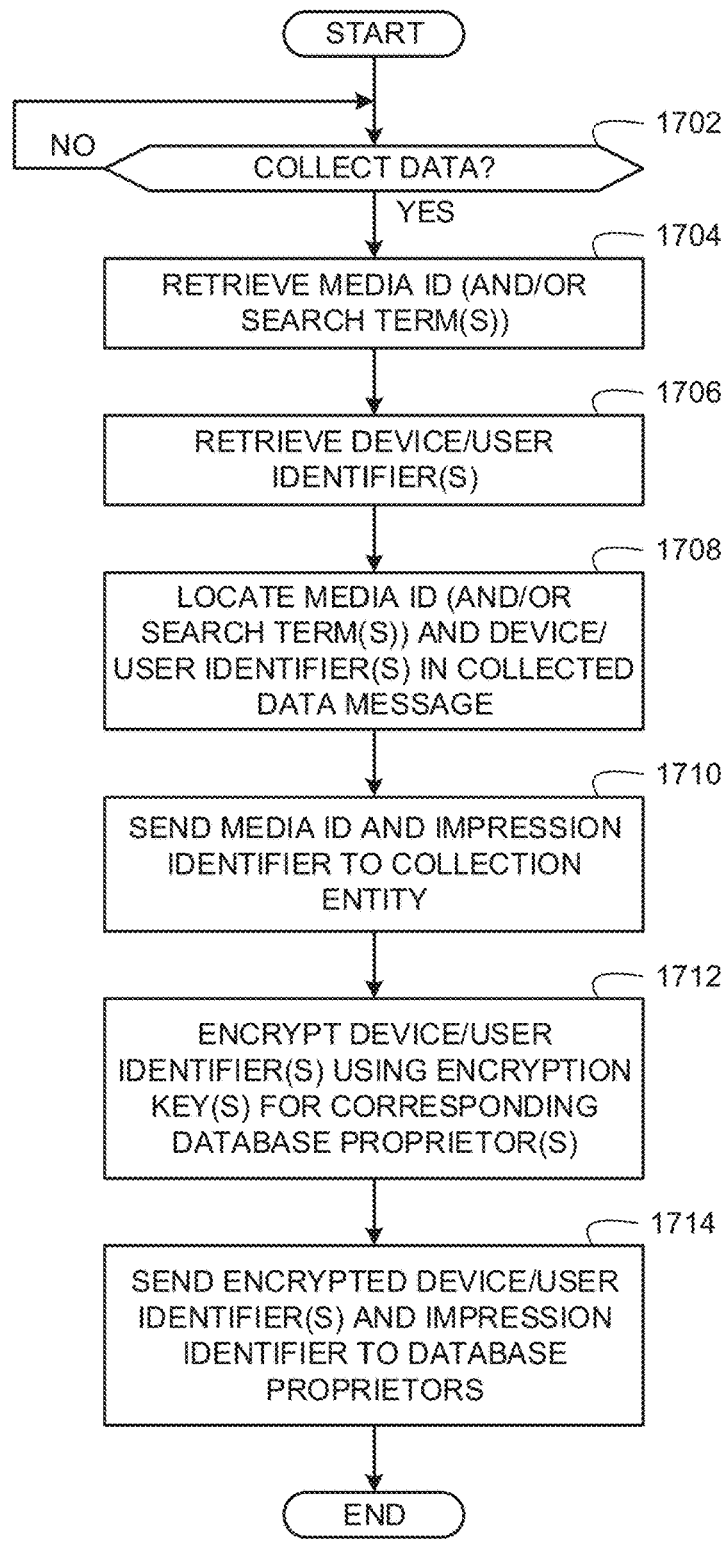
FIG. 17 is a flow diagram representative of example machine readable instructions that may be executed by the example mobile device of FIG. 16 to collect media identifiers and device and/or user identifiers at mobile devices.

FIG. 17 is a flow diagram representative of example machine readable instructions that may be executed to collect media identifiers (and/or search terms) and device and/or user identifiers at mobile devices and to associate the same with impression identifiers to facilitate de-duplication of users and/or user exposure events. The example instructions of FIG. 17 may be executed by the example mobile device 106 of FIG. 1. The example blocks 1702-1708 are substantially identical to corresponding blocks 502-508 of FIG. 5 and, thus, their description is not repeated here.

After locating the media identifier 122 (and/or search terms) (block 1708), the example mobile device 106 sends the media identifier 122 (and/or search terms) and a unique impression identifier 1602 to a collection entity (e.g., the AME 108 of FIG. 16) (block 1710). The impression identifier 1602 is a unique identifier that may be used by the AME 108 to match media identifier(s) and/or search term(s) to demographic characteristics obtained from the database proprietors 104a-b. The impression identifier 1602 is generated at the mobile device 106 using, for example, a pseudo-random number generator based on a seed provided, for example, in the accessed media.

The example mobile device 106 encrypts the device/user identifiers 124 using encryption key(s) that correspond to the example database proprietor(s) 104a-b (block 1712). For example, the mobile device 106 may encrypt the IMEI/MEID 124a of FIG. 2 using a first key associated with the partner A database proprietor 104a to generate an encrypted IMEI/MEID 208a as described above with reference to FIG. 2. Similarly, the mobile device 106 may encrypt the Android ID 124b of FIG. 2 using a first key associated with the partner B database proprietor 104b to generate an encrypted Android ID 208b.

The example mobile device 106 sends the encrypted device/user identifiers 208a-b and/or an impression identifier 1602 to the database proprietors 104a-104b (block 1714). In some examples, the mobile device 106 sends respective ones of the encrypted device/user identifiers 208a-b to the appropriate database proprietors 104a-b. In other examples, the mobile device 106 sends each of the encrypted device identifiers 208a-b to each of the database proprietors 104a-b, because the database proprietors 104a-b are only capable of decrypting the device identifier(s) for which they have a corresponding decryption key. The example instructions of FIG. 17 end and/or iterate for subsequent media impressions and/or searches.

Figure 18:
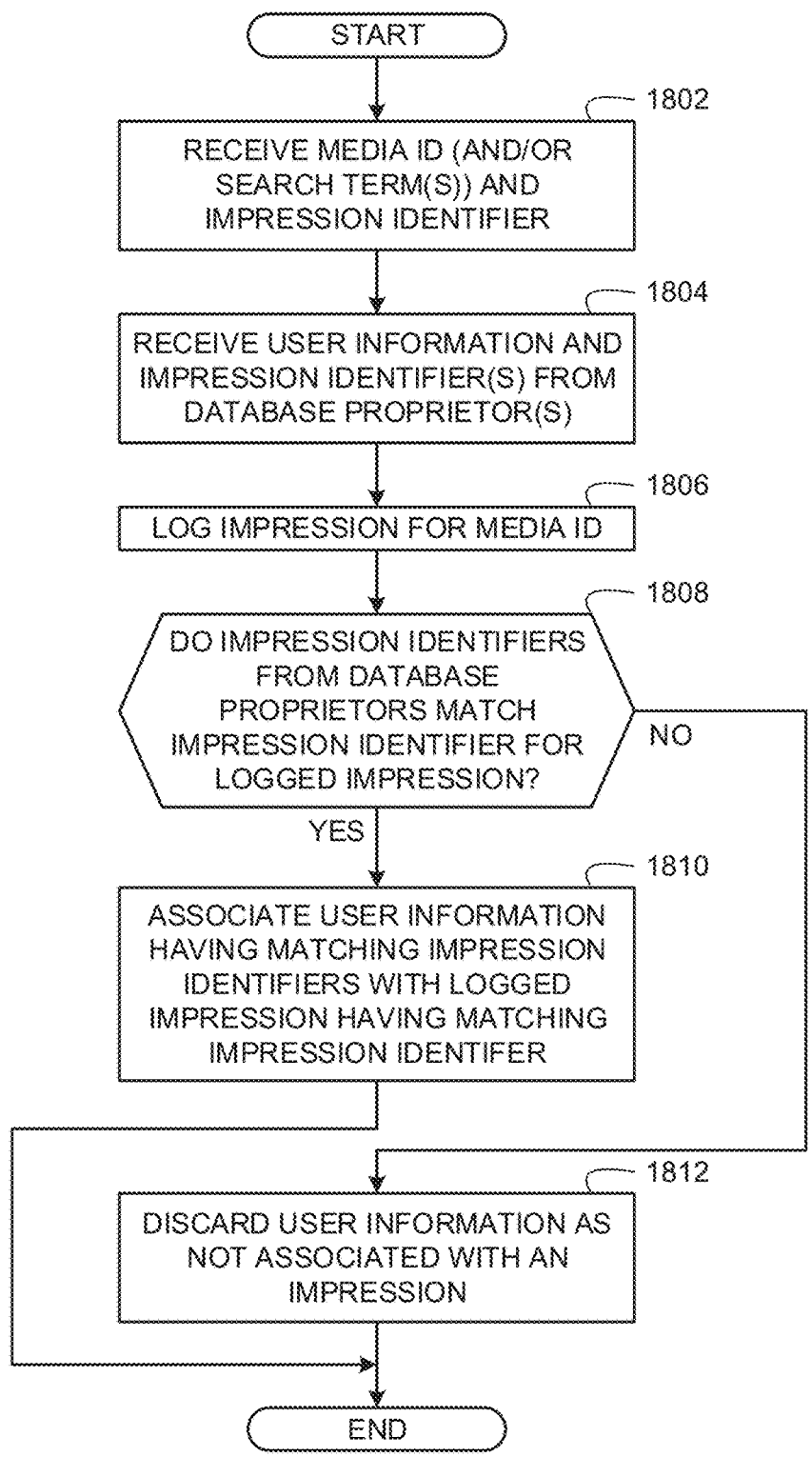
FIG. 18 is a flow diagram representative of example machine readable instructions that may be executed by the example audience measurement entity of FIG. 16 to collect media identifiers and device and/or user identifiers for media impressions on mobile devices.

FIG. 18 is a flow diagram representative of example machine readable instructions that may be executed de-duplicate exposure data collected from database proprietors. The example instructions of FIG. 18 may be performed by the AME 108 of FIG. 16. The example AME 108 receives a media identifier 122 (and/or search term(s)) in association with an impression identifier 1602 from the mobile device 106 (block 1802). In some examples, the AME 108 receives the impression identifier 1602 and the media identifier and/or the search term(s) via a third entity such as an application publisher 110 and/or the media publisher 120 of FIG. 16.

In this example, it is assumed the AME 108 also receives two or more sets of user information 102a-b and/or impression identifiers 1602 from two or more partner database proprietors 104a-b (block 1804). Each set of the user information 102a-b includes demographic characteristics identified by the corresponding database proprietor 104a-b after decrypting the encrypted device/user identifiers 208a-b received from the mobile device 106. Each of the sets of user information 102a-b is associated with a corresponding impression identifier 1602.

The example AME 108 logs an impression for the media identifier 122 (and/or search term(s)) (block 1806). For example, the AME 108 of the illustrated example stores an indication that media associated with the media identifier 122 was presented at a mobile device. In block 1806, the example AME 108 does not necessarily identify the mobile device 106 in the logged impression, but does record the impression identifier 1602 in association with that impression to enable mapping of user information received from database proprietors 104a-b to that impression at a later time.

The example AME 108 determines whether impression identifiers 1602 associated with the sets of user information 102a-b received from multiple database proprietors 104a-b match an impression identifier 1602 received from the mobile device 106 (block 1808). For example, the AME 108 may determine that one or more of the sets of user information 102a-b received from the partner database proprietors 104a-b includes an impression identifier 1602 provided by the mobile device 106. If the AME 108 receives impression identifiers 1602 from the database proprietors 104a-b matching the impression identifier 1602 received from the mobile device 106 (block 1808), the example AME 108 associates the user information 102a-b having the matching impression identifier 1602 with a logged impression having the matching impression identifier 1602 (block 1810). For example, the AME 108 may populate or associate a logged impression with user information (e.g., demographic characteristics, device characteristics, etc.) based on the impression identifiers 1602 matching.

If the AME 108 does not receive an impression identifier 1602 matching the impression identifier 1602 for the logged impression (block 1808), the example AME 108 discards the user information 102a-b as erroneous (e.g., unable to associate with an impression) (block 1812).

After associating the user information with a logged impression (Block 1810) or discarding the user information (block 1812), the example instructions of FIG. 18 end and/or iterate for additional media impressions.

Figure 19:
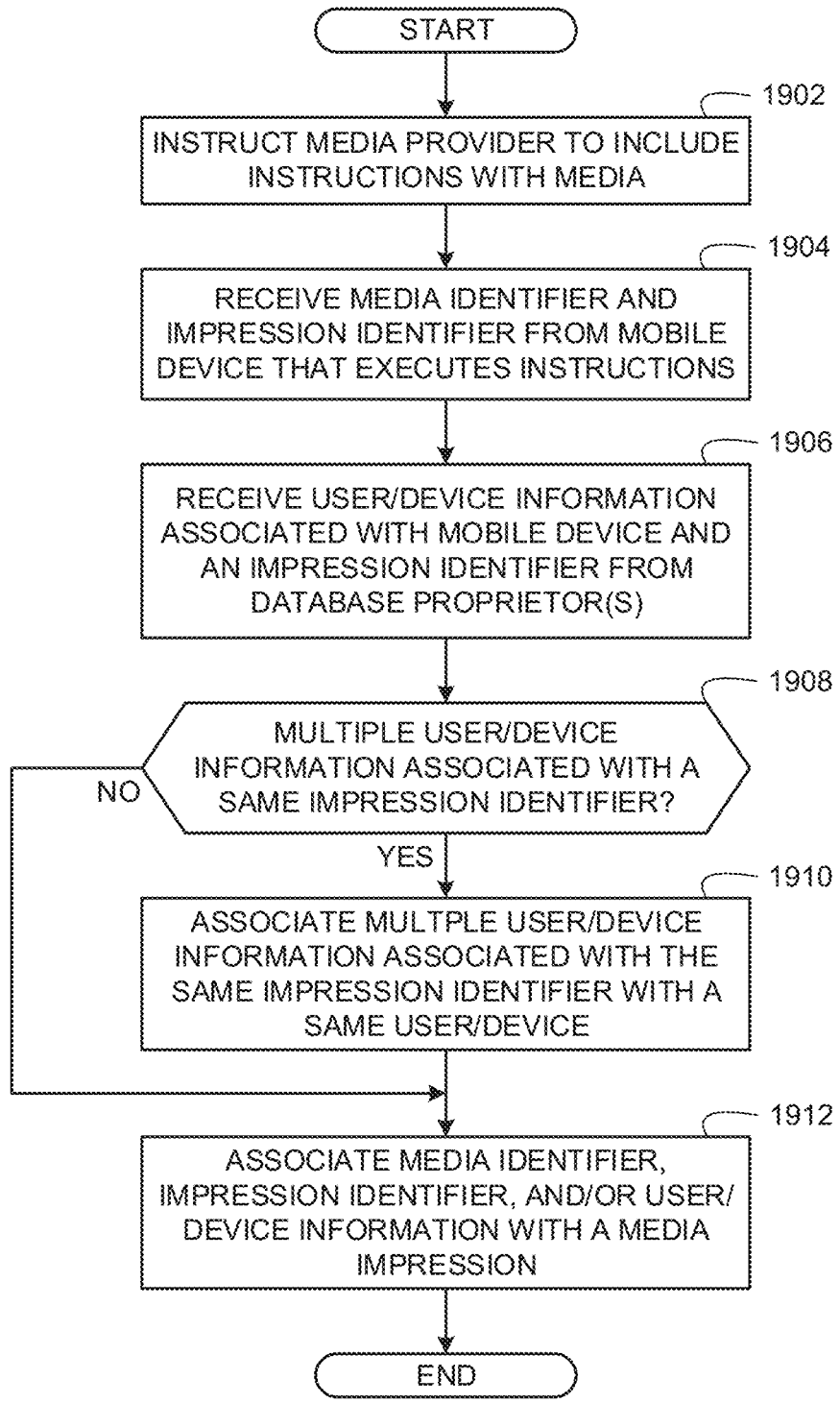
FIG. 19 is a flow diagram representative of example machine readable instructions that may be executed by the example audience measurement entity of FIG. 16 to instruct a media provider to embed instructions in media for associating user/device information with an impression of the media.

FIG. 19 is a flow diagram representative of example machine readable instructions that may be executed by the example audience measurement entity 108 of FIG. 16 to instruct a media provider to embed instructions in media (e.g., the media 118). The embedded instructions associate user/device information with an impression of the media 118. The user/device information can be used to determine characteristics of users and/or devices that are exposed to the media. By embedding the instructions in the media with each impression, the example instructions of FIG. 19 enable an audience measurement entity to, for example, (1) adapt the instructions executed by mobile devices to update the database proprietors used, (2) adapt the instructions to be embedded in the media for new devices and/or software, and/or (3) otherwise change the embedded instructions to meet new circumstances, thereby increasing the flexibility of performing media impression monitoring in response to changes in the media impression monitoring system and/or the computing environment.

The example audience measurement entity 108 (e.g., via the audience measurement server 132) instructs a media provider (e.g., the media publisher 120, the application publisher 110, etc.) to embed instructions in media (block 1902). For example, the audience measurement server 132 may provide instructions to the media publisher 120, which the media publisher 120 includes when serving requests for media 118. The instructions, when executed by the mobile device 106 that receives and presents the media 118, cause the mobile device 106 to collect and transmit user/device identifiers 124 and/or an impression identifier 1602 to the audience measurement server 132, to the media publisher 120, to the app publisher 110, and/or to the database proprietors 104a-104b. In some other examples, the audience measurement server 132 provides instructions that are included in an application that presents the media 118 instead of being included with the media 118 itself. In some examples, the instructions embedded in the media cause the mobile device 106 to perform all or part of the instructions described above with reference to FIG. 17.

At some later time, the example audience measurement server 132 of the illustrated example receives a media identifier (e.g., the media identifier 122) and an impression identifier (e.g., the impression identifier 1602) from a mobile device (e.g., the mobile device 106) that accessed the media and, thus, executed the instructions provided to the media provider (block 1904). For example, the mobile device 106 may execute the instructions included with the media 118 to send the collected data 126 including the media ID 122 and the impression identifier 1602 to the audience measurement entity 108. The example audience measurement server 132 also receives user information and/or device information associated with the mobile device 106 and the impression identifier 1602 from one or more database proprietors 104a-b (block 1906). The example user/device information is provided to the database proprietors 104*a-b* based on the instructions provided in block 1902.

The example audience measurement server 132 of FIG. 16 determines whether multiple user/device identifiers are associated with a same impression identifier 1602 (block 1908). For example, the audience measurement server 132 of the illustrated example may determine whether the same impression identifier 1602 is received from multiple database proprietors 104*a-b* in association with different user and/or device identifiers. If multiple received user/device identifiers are associated with a same impression identifier 1602 (block 1908), the example audience measurement server 132 associates the identified multiple user/device information with a same user and/or device (block 1910). For example, the audience measurement server 132 may store the user/device information in association with each other in the AME media impressions store 134. When either or both of the associated user/device information (e.g., a device identifier) is received for subsequent impressions, the example audience measurement server 132 of the illustrated example can associate subsequent impressions with any or all of the user and/or device information (e.g., a subscriber identifier, a user identifier, etc.) associated with the received user/device information.

After associating the multiple user/device information (block 1910), or if only one item of user/device information is received for an impression identifier (block 1908), the example audience measurement server 132 associates the media identifier 122, the impression identifier 1602, and/or received user/device information with a media impression (block 1912). For example, the audience measurement server 132 may store the media impression in the AME media impressions store 134 as an impression for the media 118 (e.g., to count impressions for the media 118) and/or in association with the user/device information (e.g., to count and/or track media impressions for the identified user and/or using the identified device). The example instructions of FIG. 19 then end.

Figure 8:
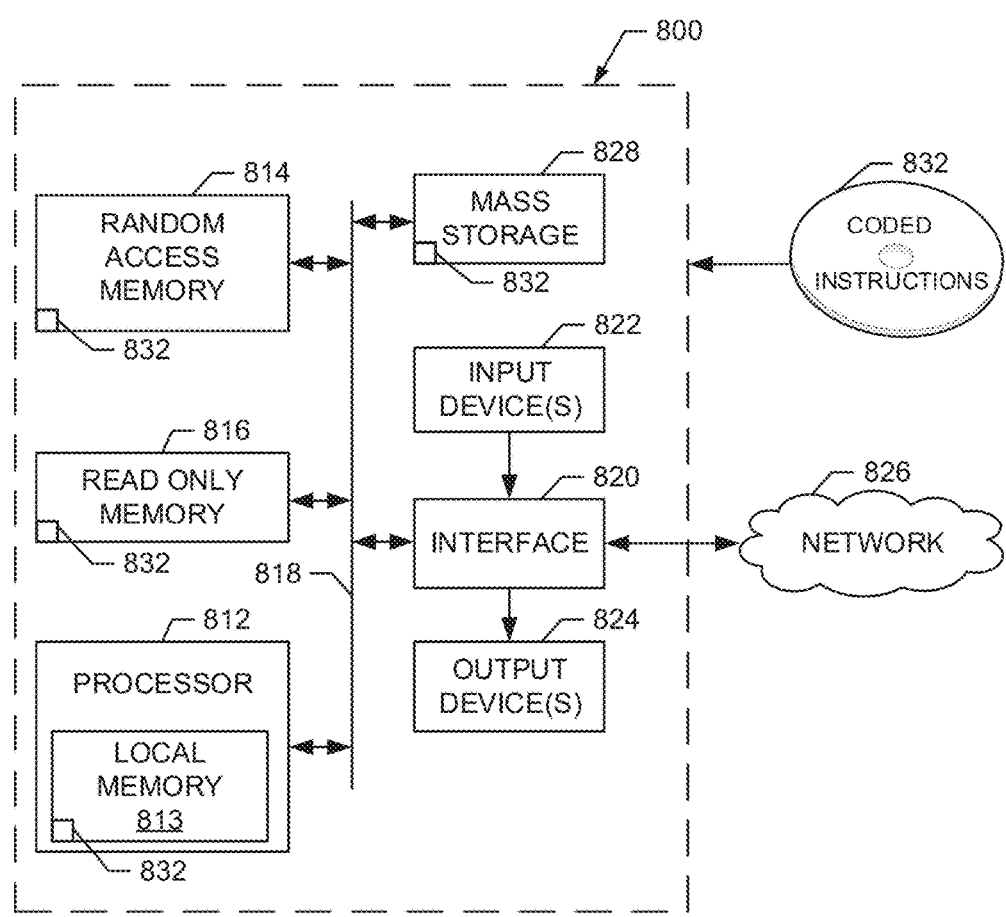
FIG. 8 is an example processor system that may be used to execute the example instructions of FIGS. 5-7, 11, 15, 17, and 18 to implement example apparatus and systems disclosed herein.

FIG. 8 is a block diagram of an example computer 800 capable of executing the instructions of FIGS. 5-7, 11, 15, 17, and/or 18. The computer 800 can be, for example, a server, a personal computer, or any other type of computing device. The system 800 of the illustrated example includes a processor 812. For example, the processor 812 can be implemented by one or more microprocessors or controllers from any desired family or manufacturer.

The processor 812 includes a local memory 813 (e.g., a cache) and is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 816 may be implemented by flash memory and/or any other desired type of memory device. Access to the main memory 814, 816 is controlled by a memory controller.

The computer 800 also includes an interface circuit 820. The interface circuit 820 may be implemented by any type of interface standard, such as an Ethernet interface, a universal serial bus (USB), and/or a PCI express interface.

One or more input devices 822 are connected to the interface circuit 820. The input device(s) 822 permit a user to enter data and commands into the processor 812. The input device(s) can be implemented by, for example, a keyboard, a mouse, a touchscreen, a track-pad, a trackball, isopoint and/or a voice recognition system.

One or more output devices 824 are also connected to the interface circuit 820. The output devices 824 can be implemented, for example, by display devices (e.g., a liquid crystal display, a cathode ray tube display (CRT), a printer and/or speakers). The interface circuit 820, thus, typically includes a graphics driver card.

The interface circuit 820 also includes a communication device such as a modem or network interface card to facilitate exchange of data with external computers via a network 826 (e.g., an Ethernet connection, a digital subscriber line (DSL), a telephone line, coaxial cable, a cellular telephone system, etc.).

The computer 800 also includes one or more mass storage devices 828 for storing software and data. Examples of such mass storage devices 828 include floppy disk drives, hard drive disks, compact disk drives and digital versatile disk (DVD) drives.

Coded instructions 832 representative of machine readable instructions of FIGS. 5-7, 11, 15, 17, and 18 may be stored in the mass storage device 828, in the volatile memory 814, in the non-volatile memory 816, and/or on a removable storage medium such as a CD or DVD.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus, comprising:
   means for collecting first and second identifiers based on use of an application that does not employ cookies, the first identifier identifying at least one of a device or a user of the device to a first database proprietor that stores first user information associated with the first identifier, and the second identifier identifying the at least one of the device or the user of the device to a second database proprietor that stores second user information associated with the second identifier; and
   means for sending identifiers to:
      send the first identifier to a first server associated with the first database proprietor;
      send the second identifier to a second server associated with the second database proprietor; and
      send to a data collection server at least one of a media identifier indicative of media accessed via the application at the device or a search term used via the application at the device.

2. The apparatus as defined in claim 1, further including:
   means for encrypting identifiers to:
      encrypt the first identifier for access by the first database proprietor; and
      encrypt the second identifier for access by the second database proprietor, the sending of the first identifier to the first server including sending the encrypted first identifier to the first server, and the sending of the second identifier to the second server including sending the encrypted second identifier to the second server.

3. The apparatus as defined in claim 2, further including means for encoding to encode the encrypted first identifier and the encrypted second identifier in a single identifier, the sending of the encrypted first identifier including sending the single identifier to the first server and the sending of the encrypted second identifier including sending the single identifier to the second server.

4. The apparatus as defined in claim 2, wherein the means for encrypting identifiers is further to:
associate a first database proprietor identifier with the encrypted first identifier; and
associate a second database proprietor identifier with the encrypted second identifier, the first database proprietor identifier indicative of the encrypted first identifier corresponding to the first database proprietor, and the second database proprietor identifier indicative of the encrypted second identifier corresponding to the second database proprietor.

5. The apparatus as defined in claim 1, wherein the first user information includes first demographic information collected from the user of the device by the first database proprietor, and the second user information includes second demographic information collected from the user of the device by the second database proprietor.

6. The apparatus as defined in claim 1, wherein the first database proprietor is a social network service, and the second database proprietor is a wireless service provider, the first identifier including a username of the user registered with the social network service, and the second identifier including a device identifier used by the wireless service provider to identify the device.

7. The apparatus as defined in claim 1, wherein the means for sending the identifiers is further to:
send an impression identifier in association with the first identifier to the first server;
send the impression identifier in association with the second identifier to the second server; and
send the impression identifier in association with the at least one of the media identifier or the search term to the data collection server, the impression identifier to facilitate associating the first and second user information from corresponding ones of the first and second database proprietors with the at least one of the media identifier or the search term collected by the data collection server.

8. An apparatus, comprising:
means for communicating to instruct a media provider to associate executable instructions with media;
the means for communicating further to access data from a media device, the data sent in response to the media device executing the instructions, the instructions to cause the media device to:
collect a media identifier indicative of media presented at the media device;
encrypt a user identifier that identifies a user of the media device, the encrypting of the user identifier based on a first encryption key corresponding to a first database proprietor having first user information associated with the user identifier; and
encrypt a device identifier that identifies the media device, the encrypting of the device identifier based on a second encryption key corresponding to a second database proprietor having second user information associated with the device identifier; and
means for sending identifiers to:
send the media identifier in association with an impression identifier to the means for communicating;
send the encrypted user identifier and the impression identifier to a first server associated with the first database proprietor; and
send the encrypted device identifier and the impression identifier to a second server associated with the second database proprietor.

9. The apparatus as defined in claim 8, wherein the data received from the media device includes the media identifier and the impression identifier.

10. The apparatus as defined in claim 9, wherein the means for communicating is further to associate the data received from the media device with a media impression based on the impression identifier.

11. The apparatus as defined in claim 8, wherein the means for communicating is further to:
access the first user information from the first database proprietor;
access the second user information from the second database proprietor; and
identify the first user information and the second user information as associated with a same user based on the impression identifier.

12. The apparatus as defined in claim 11, wherein the means for communicating is further to associate the first user information and the second user information with the media identifier based on the identifying of the first user information and the second user information as associated with the same user based on the impression identifier.

13. The apparatus as defined in claim 8, further including:
means for encoding the encrypted user identifier and the encrypted device identifier in a single identifier;
the means for communicating further to:
send the encrypted user identifier by sending the single identifier to the first server; and
send the encrypted device identifier by sending the single identifier to the second server.

14. An apparatus, comprising:
means for accessing a media identifier and an impression identifier received from a media device, the media identifier being indicative of media presented at the media device;
means for accessing first user information and second user information:
the first user information received in association with the impression identifier from a first database proprietor as a result of the first database proprietor obtaining a first identifier encrypted with a first encryption key by the media device and sent from the media device, the first identifier identifying at least one of the media device or a user of the media device, and
the second user information received in association with the impression identifier from a second database proprietor based on the second database proprietor obtaining a second identifier encrypted with a second encryption key by the media device and sent from the media device, the second identifier identifying at least one of the media device or the user of the media device, the second identifier being different than the first identifier;
means for identifying the first user information and the second user information as associated with a same user based on the impression identifier; and
means for associating the first user information and the second user information with the media identifier.

15. The apparatus as defined in claim 14, wherein the first database proprietor includes a social network service and the second database proprietor includes a wireless service provider, the first identifier including a username of the user registered with the social network service, and the second identifier including a device identifier used by the wireless service provider to identify the media device.

16. The apparatus as defined in claim 15, wherein the first user information includes first demographic information of the user stored by the social network service, and the second user information includes second demographic information of the user stored by the wireless service provider.

\* \* \* \* \*